United States Patent
Han et al.

(10) Patent No.: US 10,390,321 B2
(45) Date of Patent: Aug. 20, 2019

(54) TIMING ADVANCE ADJUSTMENT METHOD AND DEVICE

(71) Applicant: Huawei Technologies Co., Ltd., Shenzhen (CN)

(72) Inventors: Jing Han, Beijing (CN); Dengkun Xiao, Shenzhen (CN); Jie Cui, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 112 days.

(21) Appl. No.: 15/143,252

(22) Filed: Apr. 29, 2016

(65) Prior Publication Data
US 2016/0249312 A1  Aug. 25, 2016

Related U.S. Application Data

(63) Continuation of application No. PCT/CN2013/086380, filed on Oct. 31, 2013.

(51) Int. Cl.
*H04W 56/00* (2009.01)
*H04W 76/14* (2018.01)

(52) U.S. Cl.
CPC ....... *H04W 56/0045* (2013.01); *H04W 76/14* (2018.02)

(58) Field of Classification Search
CPC .............................. H04W 56/00; H04W 21/10
See application file for complete search history.

(56) References Cited

U.S. PATENT DOCUMENTS

| 2014/0036890 A1 | 2/2014 | Iwamura et al. |
| 2014/0050153 A1* | 2/2014 | Iwamura ........... H04W 56/0015 370/328 |

(Continued)

FOREIGN PATENT DOCUMENTS

| CN | 102165840 A | 8/2011 |
| CN | 103108389 A | 5/2013 |

(Continued)

OTHER PUBLICATIONS

"$3^{rd}$ Generation Partnership Project; Technical Specification Group Radio Access Network; Evolved Universal Terrestrial Radio Access (E-UTRA); Medium Access Control (MAC) protocol specification (Release 11)," 3GPP TS 36.321, V11.3.0, pp. 1-57, $3^{rd}$ Generation Partnership Project, Valbonne, France (Jun. 2013).

(Continued)

*Primary Examiner* — Brandon M Renner
(74) *Attorney, Agent, or Firm* — Leydig, Voit & Mayer, Ltd.

(57) ABSTRACT

Embodiments of the present invention relate to the field of mobile communications technologies, and disclose a timing advance adjustment method and device, so as to implement precise timing synchronization between user equipments. The method includes: acquiring, by a base station, timing information determined by first user equipment, where the timing information is used to identify a timing relationship between the first user equipment and second user equipment; acquiring a TA command according to the timing information, where the TA command is used to adjust a signal sending time of a TA command receive end, where the TA command receive end is the first user equipment and/or the second user equipment; and sending the TA command to the TA command receive end.

20 Claims, 11 Drawing Sheets

(56) References Cited

U.S. PATENT DOCUMENTS

| | | | |
|---|---|---|---|
| 2014/0112304 A1* | 4/2014 | Shimizu | H04J 13/16 370/330 |
| 2014/0135026 A1* | 5/2014 | Hamada | H04W 24/02 455/452.1 |
| 2014/0341208 A1 | 11/2014 | Charbit et al. | |
| 2015/0043438 A1* | 2/2015 | Fwu | H04W 28/24 370/329 |
| 2015/0092689 A1* | 4/2015 | Ko | H04L 1/1861 370/329 |
| 2015/0171944 A1* | 6/2015 | Kalhan | H04W 76/14 370/329 |

FOREIGN PATENT DOCUMENTS

| | | |
|---|---|---|
| WO | WO 2010108549 A1 | 9/2010 |
| WO | WO 2013067686 A1 | 5/2013 |
| WO | WO 2013104084 A1 | 7/2013 |

OTHER PUBLICATIONS

"3$^{rd}$ Generation Partnership Project; Technical Specification Group Radio Access Network; Evolved Universal Terrestrial Radio Access (E-UTRA); Radio Resource Control (RRC); Protocol specification (Release 11)," 3GPP TS 36.331, V11.5.0, pp. 1-347, 3$^{rd}$ Generation Partnership Project, Valbonne, France (Sep. 2013).

"3$^{rd}$ Generation Partnership Project; Technical Specification Group Radio Access Network; Evolved Universal Terrestrial Radio Access Network (E-UTRAN); X2 application protocol (X2AP) (Release 11)," 3GPP TS 36.423, V11.6.0, pp. 1-144, 3$^{rd}$ Generation Partnership Project, Valbonne, France (Sep. 2013).

* cited by examiner

TIMING ADVANCE ADJUSTMENT METHOD AND DEVICE

CROSS REFERENCE

This application is a continuation of International Patent Application No. PCT/CN2013/086380, filed on Oct. 31, 2013, which is hereby incorporated by reference in its entirety.

TECHNICAL FIELD

Embodiments of the present invention relate to the field of mobile communications technologies, and in particular, to a timing advance adjustment method and device.

BACKGROUND

Currently, with rapid development of information technologies, a capacity of a communications system needs to be further expanded to meet high-speed service requirements of user equipment (UE), and requirements of a mobile communications system for a bandwidth are also increasingly high. In order to meet the foregoing requirements, a device to device (D2D) communications technology emerges as the time requires. D2D communications is data exchange or a service that is directly performed between devices without forwarding by a base station.

When user equipments directly perform data transmission, transmission timing of user equipment that sends data is different from transmission timing of a base station. If user equipment that receives data determines, according to the transmission timing of the base station, a moment for receiving data transmitted from the user equipment that sends data, a timing synchronization deviation occurs between the user equipments. In addition, movement of UE is not limited in D2D communications; therefore, in D2D communications, a distance between UEs and a channel environment change with movement of UE, which also causes a timing synchronization deviation between the user equipments. As a result, the user equipment cannot correctly extract data, leading to a data decoding error, and reducing a system throughput.

SUMMARY

Embodiments of the present invention provide a timing advance adjustment method and device, so as to achieve precise timing synchronization between user equipments by performing timing advance (TA) adjustment on the user equipments, so that the user equipment can correctly extract data to correctly decode the data, thereby improving a system throughput.

To achieve the foregoing objective, the following technical solutions are used in the embodiments of the present invention:

According to a first aspect, a timing advance adjustment method is provided, including:

acquiring, by a base station, timing information determined by first user equipment, where the timing information is used to identify a timing relationship between the first user equipment and second user equipment;

acquiring a TA command according to the timing information, where the TA command is used to adjust a signal sending time of a TA command receive end, and the TA command receive end is the first user equipment and/or the second user equipment; and sending the TA command to the TA command receive end.

In a first possible implementation manner of the first aspect, the timing information includes: a link identifier of a link between the first user equipment and the second user equipment, and the timing relationship between the first user equipment and the second user equipment; and the acquiring a TA command according to the timing information includes:

determining, according to the link identifier, that objects/an object on which timing advance adjustment is to be performed are/is the first user equipment and/or the second user equipment;

acquiring a TA adjustment value of the link between the first user equipment and the second user equipment according to the timing relationship between the first user equipment and the second user equipment, a timing relationship between the base station and the first user equipment, and a timing relationship between the base station and the second user equipment; and generating the TA command, where the TA command includes: the link identifier of the link between the first user equipment and the second user equipment, and the TA adjustment value of the link between the first user equipment and the second user equipment.

In a second possible implementation manner of the first aspect, the timing information includes: equipment identifiers of the first user equipment and the second user equipment, and the timing relationship between the first user equipment and the second user equipment; and the acquiring a TA command according to the timing information includes:

determining, according to the equipment identifiers, that objects/an object on which timing advance adjustment is to be performed are/is the first user equipment and/or the second user equipment;

acquiring a TA adjustment value of a link between the first user equipment and the second user equipment according to the timing relationship between the first user equipment and the second user equipment, a timing relationship between the base station and the first user equipment, and a timing relationship between the base station and the second user equipment; and generating the TA command, where the TA command includes: the equipment identifiers of the first user equipment and the second user equipment, and the TA adjustment value of the link between the first user equipment and the second user equipment.

With reference to any one of the first aspect and the previous two possible implementation manners of the first aspect, a third possible implementation manner of the first aspect is further provided, where the TA command further includes: a TA adjustment value of a link between the TA command receive end and the base station.

According to a second aspect, a timing advance adjustment method is provided, including:

establishing, by first user equipment, a D2D link to second user equipment;

determining timing information between the first user equipment and the second user equipment, where the timing information is used to identify a timing relationship between the first user equipment and the second user equipment;

sending the timing information to a base station;

receiving a TA command sent by the base station, where the TA command is acquired by the base station according to the timing information; and adjusting a signal sending time according to the TA command.

In a first possible implementation manner of the second aspect, the timing information includes: a link identifier of a link between the first user equipment and the second user equipment, and the timing relationship between the first user equipment and the second user equipment; and the TA command includes: the link identifier of the link between the first user equipment and the second user equipment, and a TA adjustment value of the link between the first user equipment and the second user equipment.

In a second possible implementation manner of the second aspect, the timing information includes: equipment identifiers of the first user equipment and the second user equipment, and the timing relationship between the first user equipment and the second user equipment; and the TA command includes: the equipment identifiers of the first user equipment and the second user equipment, and a TA adjustment value of a link between the first user equipment and the second user equipment.

With reference to any one of the second aspect and the previous two possible implementation manners of the second aspect, a third possible implementation manner of the second aspect is further provided, where the TA command further includes: a TA adjustment value of a link between the first user equipment and the base station.

According to a third aspect, a timing advance adjustment method is provided, including:

establishing, by second user equipment, a D2D link to first user equipment;

receiving a TA command sent by a base station, where the TA command is acquired by the base station according to timing information sent by the first user equipment, and the timing information is determined by the first user equipment and is used to identify a timing relationship between the first user equipment and the second user equipment; and adjusting a signal sending time according to the TA command.

In a first possible implementation manner of the third aspect, the timing information includes: a link identifier of a link between the first user equipment and the second user equipment, and the timing relationship between the first user equipment and the second user equipment; and the TA command includes: the link identifier of the link between the first user equipment and the second user equipment, and a TA adjustment value of the link between the first user equipment and the second user equipment.

In a second possible implementation manner of the third aspect, the timing information includes: equipment identifiers of the first user equipment and the second user equipment, and the timing relationship between the first user equipment and the second user equipment; and the TA command includes: the equipment identifiers of the first user equipment and the second user equipment, and a TA adjustment value of a link between the first user equipment and the second user equipment.

With reference to any one of the third aspect and the previous two possible implementation manners of the third aspect, a third possible implementation manner of the third aspect is further provided, where the TA command further includes: a TA adjustment value of a link between the second user equipment and the base station.

According to a fourth aspect, a timing advance adjustment method is provided, including:

establishing, by first user equipment, a D2D link to second user equipment;

determining timing information between the first user equipment and the second user equipment, where the timing information is used to identify a timing relationship between the first user equipment and the second user equipment;

acquiring a TA command according to the timing information, where the TA command is used to adjust a signal sending time of the second user equipment; and sending the TA command to the second user equipment.

In a first possible implementation manner of the fourth aspect, the timing information includes: a link identifier of a link between the first user equipment and the second user equipment, and the timing relationship between the first user equipment and the second user equipment; and the acquiring a TA command according to the timing information includes:

determining, according to the link identifier, that an object on which timing advance adjustment is to be performed is the second user equipment;

acquiring a TA adjustment value of a link between the first user equipment and the second user equipment according to the timing relationship between the first user equipment and the second user equipment; and generating the TA command, where the TA command includes: the link identifier of the link between the first user equipment and the second user equipment, and the TA adjustment value of the link between the first user equipment and the second user equipment.

In a second possible implementation manner of the fourth aspect, the timing information includes: equipment identifiers of the first user equipment and the second user equipment, and the timing relationship between the first user equipment and the second user equipment; and the acquiring a TA command according to the timing information includes:

determining, according to the equipment identifiers, that an object on which timing advance adjustment is to be performed is the second user equipment;

acquiring a TA adjustment value of a link between the first user equipment and the second user equipment according to the timing relationship between the first user equipment and the second user equipment; and generating the TA command, where the TA command includes: the equipment identifiers of the first user equipment and the second user equipment, and the TA adjustment value of the link between the first user equipment and the second user equipment.

With reference to any one of the fourth aspect and the previous two possible implementation manners of the fourth aspect, a third possible implementation manner of the fourth aspect is further provided, where the sending the TA command to the second user equipment includes:

sending, by the first user equipment, the TA command to the second user equipment by using an interface between terminals.

With reference to any one of the fourth aspect and the previous three possible implementation manners of the fourth aspect, a fourth possible implementation manner of the fourth aspect is further provided, where after the sending, by the first user equipment, the TA command to the second user equipment, the method further includes: receiving handshake signaling sent by the second user equipment.

With reference to the fourth possible implementation manner of the fourth aspect, a fifth possible implementation manner of the fourth aspect is further provided, where the receiving handshake signaling sent by the second user equipment includes: receiving, by the first user equipment by using the interface between the terminals, the handshake signaling sent by the second user equipment.

According to a fifth aspect, a timing advance adjustment method is provided, including:

establishing, by second user equipment, a D2D link to first user equipment;

receiving a TA command sent by the first user equipment, where the TA command is acquired by the first user equipment according to determined timing information, and the timing information is used to identify a timing relationship between the first user equipment and the second user equipment; and adjusting a signal sending time according to the TA command.

In a first possible implementation manner of the fifth aspect, the timing information includes: a link identifier of a link between the first user equipment and the second user equipment, and the timing relationship between the first user equipment and the second user equipment; and the TA command includes: the link identifier of the link between the first user equipment and the second user equipment, and a TA adjustment value of the link between the first user equipment and the second user equipment.

In a second possible implementation manner of the fifth aspect, the timing information includes: equipment identifiers of the first user equipment and the second user equipment, and the timing relationship between the first user equipment and the second user equipment; and the TA command includes: the equipment identifiers of the first user equipment and the second user equipment, and a TA adjustment value of a link between the first user equipment and the second user equipment.

With reference to any one of the fifth aspect and the previous two possible implementation manners of the fifth aspect, a third possible implementation manner of the fifth aspect is further provided, where the receiving a TA command sent by the first user equipment includes: receiving, by the second user equipment by using an interface between terminals, the TA command sent by the first user equipment.

With reference to any one of the fifth aspect and the previous three possible implementation manners of the fifth aspect, a fourth possible implementation manner of the fifth aspect is further provided, where after the receiving a TA command sent by the first user equipment, the method further includes: sending handshake signaling to the first user equipment.

With reference to the fourth possible implementation manner of the fifth aspect, a fifth possible implementation manner of the fifth aspect is further provided, where the sending handshake signaling to the first user equipment includes: sending, by the second user equipment by using the interface between the terminals, the handshake signaling to the first user equipment.

According to a sixth aspect, a base station is provided, including:

a first acquiring module, configured to acquire timing information determined by first user equipment, where the timing information is used to identify a timing relationship between the first user equipment and second user equipment;

a second acquiring module, configured to acquire a TA command according to the timing information acquired by the first acquiring module, where the TA command is used to adjust a signal sending time of a TA command receive end, and the TA command receive end is the first user equipment and/or the second user equipment; and a sending module, configured to send the TA command acquired by the second acquiring module to the TA command receive end.

In a first possible implementation manner of the sixth aspect, the timing information acquired by the first acquiring module includes: a link identifier of a link between the first user equipment and the second user equipment, and the timing relationship between the first user equipment and the second user equipment; and the second acquiring module specifically includes:

a determining unit, configured to determine, according to the link identifier acquired by the first acquiring module, that objects/an object on which timing advance adjustment is to be performed are/is the first user equipment and/or the second user equipment;

an acquiring unit, configured to acquire a TA adjustment value of the link between the first user equipment and the second user equipment according to the timing relationship between the first user equipment and the second user equipment that is acquired by the first acquiring module, a timing relationship between the base station and the first user equipment, and a timing relationship between the base station and the second user equipment; and a generating unit, configured to generate the TA command according to the link identifier acquired by the determining unit and the TA adjustment value acquired by the acquiring unit, where the TA command includes: the link identifier of the link between the first user equipment and the second user equipment, and the TA adjustment value of the link between the first user equipment and the second user equipment.

In a second possible implementation manner of the sixth aspect, the timing information acquired by the first acquiring module includes: equipment identifiers of the first user equipment and the second user equipment, and the timing relationship between the first user equipment and the second user equipment; and the second acquiring module specifically includes:

the determining unit, further configured to determine, according to the equipment identifiers acquired by the first acquiring module, that objects/an object on which timing advance adjustment is to be performed are/is the first user equipment and/or the second user equipment;

the acquiring unit, further configured to acquire a TA adjustment value of the link between the first user equipment and the second user equipment according to the timing relationship between the first user equipment and the second user equipment that is acquired by the first acquiring module, a timing relationship between the base station and the first user equipment, and a timing relationship between the base station and the second user equipment; and the generating unit, further configured to generate the TA command according to the link identifier acquired by the determining unit and the TA adjustment value acquired by the acquiring unit, where the TA command includes: the equipment identifiers of the first user equipment and the second user equipment, and the TA adjustment value of the link between the first user equipment and the second user equipment.

With reference to any one of the sixth aspect and the previous two possible implementation manners of the sixth aspect, a third possible implementation manner of the sixth aspect is further provided, where the TA command generated by the generating unit further includes: a TA adjustment value of a link between the TA command receive end and the base station.

According to a seventh aspect, user equipment is provided, including:

an establishment module, configured to establish a D2D link to second user equipment;

a determining module, configured to determine timing information between the user equipment and the second user equipment according to the D2D link established by the establishment module, where the timing information is used to identify a timing relationship between the user equipment and second user equipment;

a sending module, configured to send the timing information acquired by the determining module to a base station;

a receiving module, configured to receive a TA command sent by the base station, where the TA command is acquired by the base station according to the timing information sent by the sending module; and an adjustment module, configured to adjust a signal sending time according to the TA command of the receiving module.

In a first possible implementation manner of the seventh aspect, the timing information acquired by the determining module includes: a link identifier of a link between the user equipment and the second user equipment, and the timing relationship between the user equipment and the second user equipment; and the TA command acquired by the receiving module includes: the link identifier of the link between the user equipment and the second user equipment, and a TA adjustment value of the link between the user equipment and the second user equipment.

In a second possible implementation manner of the seventh aspect, the timing information acquired by the determining module includes: equipment identifiers of the user equipment and the second user equipment, and the timing relationship between the user equipment and the second user equipment; and the TA command acquired by the receiving module includes: the equipment identifiers of the user equipment and the second user equipment, and a TA adjustment value of a link between the user equipment and the second user equipment.

With reference to any one of the seventh aspect and the previous two possible implementation manners of the seventh aspect, a third possible implementation manner of the seventh aspect is further provided, where the TA command acquired by the receiving module further includes: a TA adjustment value of a link between the user equipment and the base station.

According to an eighth aspect, user equipment is provided, including:

an establishment module, configured to establish a D2D link to first user equipment;

a receiving module, configured to receive a TA command sent by a base station, where the TA command is acquired by the base station according to timing information sent by the first user equipment, and the timing information is determined by the first user equipment and is used to identify a timing relationship between the first user equipment and the second user equipment; and an adjustment module, configured to adjust a signal sending time according to the TA command acquired by the receiving module.

In a first possible implementation manner of the eighth aspect, the timing information includes: a link identifier of a link between the first user equipment and the second user equipment, and the timing relationship between the first user equipment and the second user equipment; and the TA command acquired by the receiving module includes: the link identifier of the link between the first user equipment and the user equipment, and a TA adjustment value of the link between the first user equipment and the user equipment.

In a second possible implementation manner of the eighth aspect, the timing information includes: equipment identifiers of the first user equipment and the user equipment, and the timing relationship between the first user equipment and the user equipment; and the TA command acquired by the receiving module includes: the equipment identifiers of the first user equipment and the second user equipment, and a TA adjustment value of a link between the first user equipment and the second user equipment.

With reference to any one of the eighth aspect and the previous two possible implementation manners of the eighth aspect, a third possible implementation manner of the eighth aspect is further provided, where the TA command acquired by the receiving module further includes: a TA adjustment value of a link between the user equipment and the base station.

According to a ninth aspect, user equipment is provided, including:

an establishment module, configured to establish a D2D link to second user equipment;

a determining module, configured to determine timing information between the user equipment and the second user equipment according to the D2D link established by the establishment module, where the timing information is used to identify a timing relationship between the user equipment and second user equipment;

an acquiring module, configured to acquire a TA command according to the timing information acquired by the determining module, where the TA command is used to adjust a signal sending time of the second user equipment; and a sending module, configured to send the TA command acquired by the acquiring module to the second user equipment.

In a first possible implementation manner of the ninth aspect, the timing information acquired by the determining module includes: a link identifier of a link between the user equipment and the second user equipment, and the timing relationship between the user equipment and the second user equipment; and the acquiring module specifically includes:

a determining unit, configured to determine, according to the link identifier acquired by the determining module, that an object on which timing advance adjustment is to be performed is the second user equipment;

an acquiring unit, configured to acquire a TA adjustment value of the link between the user equipment and the second user equipment according to the timing relationship between the user equipment and the second user equipment that is acquired by the determining module; and a generating unit, configured to generate the TA command according to the link identifier acquired by the determining unit and the TA adjustment value acquired by the acquiring unit, where the TA command includes: the link identifier of the link between the user equipment and the second user equipment, and the TA adjustment value of the link between the user equipment and the second user equipment.

In a second possible implementation manner of the ninth aspect, the timing information acquired by the determining module includes: equipment identifiers of the user equipment and the second user equipment, and the timing relationship between the user equipment and the second user equipment; and the acquiring module specifically includes:

the determining unit, further configured to determine, according to the equipment identifiers acquired by the determining module, that an object on which timing advance adjustment is to be performed is the second user equipment;

the acquiring unit, further configured to acquire a TA adjustment value of a link between the user equipment and the second user equipment according to the timing relationship between the user equipment and the second user equipment that is acquired by the determining module; and the generating unit, further configured to generate the TA command according to the equipment identifiers acquired by the determining unit and the TA adjustment value acquired by the acquiring unit, where the TA command includes: the equipment identifiers of the user equipment and the second user equipment, and the TA adjustment value of the link between the user equipment and the second user equipment.

With reference to any one of the ninth aspect and the previous two possible implementation manners of the ninth aspect, a third possible implementation manner of the ninth aspect is further provided, where the sending module is specifically configured to send the TA command acquired by the acquiring module to the second user equipment by using an interface between terminals.

With reference to any one of the ninth aspect and the previous three possible implementation manners of the ninth aspect, a fourth possible implementation manner of the ninth aspect is further provided, where after the sending module sends the TA command to the second user equipment, the receiving module is further configured to receive handshake signaling sent by the second user equipment.

With reference to the fourth possible implementation manner of the ninth aspect, a fifth possible implementation manner of the ninth aspect is further provided, where the receiving module is specifically configured to receive, by using the interface between the terminals, the handshake signaling sent by the second user equipment.

According to a tenth aspect, user equipment is provided, including:

an establishment module, configured to establish a D2D link to first user equipment;

a receiving module, configured to receive a TA command sent by the first user equipment, where the TA command is acquired by the first user equipment according to determined timing information, and the timing information is used to identify a timing relationship between the first user equipment and the second user equipment; and an adjustment module, configured to adjust a signal sending time according to the TA command acquired by the receiving module.

In a first possible implementation manner of the tenth aspect, the timing information includes: a link identifier of a link between the first user equipment and the user equipment, and the timing relationship between the first user equipment and the user equipment; and the TA command acquired by the receiving module includes: the link identifier of the link between the first user equipment and the user equipment, and a TA adjustment value of the link between the first user equipment and the user equipment.

In a second possible implementation manner of the tenth aspect, the timing information includes: equipment identifiers of the first user equipment and the second user equipment, and the timing relationship between the first user equipment and the second user equipment; and the TA command acquired by the receiving module includes: the equipment identifiers of the first user equipment and the user equipment, and a TA adjustment value of a link between the first user equipment and the user equipment.

With reference to any one of the tenth aspect and the previous two possible implementation manners of the tenth aspect, a third possible implementation manner of the tenth aspect is further provided, where the receiving module is specifically configured to receive, by using an interface between terminals, the TA command sent by the first user equipment.

With reference to any one of the tenth aspect and the previous three possible implementation manners of the tenth aspect, a fourth possible implementation manner of the tenth aspect is further provided, where after the receiving module receives the TA command sent by the first user equipment, the sending module is further configured to send handshake signaling to the first user equipment.

With reference to the fourth possible implementation manner of the tenth aspect, a fifth possible implementation manner of the tenth aspect is further provided, where the sending module is specifically configured to send the handshake signaling to the first user equipment by using the interface between the terminals.

According to an eleventh aspect, a base station is provided, including: a receiver, a processor, and a transmitter, where the receiver is configured to acquire timing information determined by first user equipment, where the timing information is used to identify a timing relationship between the first user equipment and second user equipment;

the processor is configured to acquire a TA command according to the timing information acquired by the receiver, where the TA command is used to adjust a signal sending time of a TA command receive end, and the TA command receive end is the first user equipment and/or the second user equipment; and the transmitter is configured to send the TA command to the TA command receive end.

In a first possible implementation manner of the eleventh aspect, the timing information acquired by the receiver includes: a link identifier of a link between the first user equipment and the second user equipment, and the timing relationship between the first user equipment and the second user equipment; and the processor is configured to determine, according to the link identifier, that objects/an object on which timing advance adjustment is to be performed are/is the first user equipment and/or the second user equipment; acquire a TA adjustment value of the link between the first user equipment and the second user equipment according to the timing relationship between the first user equipment and the second user equipment, a timing relationship between the base station and the first user equipment, and a timing relationship between the base station and the second user equipment; and generate the TA command, where the TA command includes: the link identifier of the link between the first user equipment and the second user equipment, and the TA adjustment value of the link between the first user equipment and the second user equipment.

In a second possible implementation manner of the eleventh aspect, the timing information acquired by the receiver includes: equipment identifiers of the first user equipment and the second user equipment, and the timing relationship between the first user equipment and the second user equipment; and the processor is configured to determine, according to the equipment identifiers, that objects/an object on which timing advance adjustment is to be performed are/is the first user equipment and/or the second user equipment; acquire a TA adjustment value of a link between the first user equipment and the second user equipment according to the timing relationship between the first user equipment and the second user equipment, a timing relationship between the base station and the first user equipment, and a timing relationship between the base station and the second user equipment; and generate the TA command, where the TA command includes: the equipment identifiers of the first user equipment and the second user equipment, and the TA adjustment value of the link between the first user equipment and the second user equipment.

With reference to any one of the eleventh aspect and the previous two possible implementation manners of the eleventh aspect, a third possible implementation manner of the eleventh aspect is provided, where the TA command acquired by the receiver further includes: a TA adjustment value of a link between the TA command receive end and the base station.

According to a twelfth aspect, user equipment is provided, including: a receiver, a processor, and a transmitter, where the processor is configured to establish a D2D link to second user equipment, and determine timing information between the user equipment and the second user equipment, where the timing information is used to identify a timing relationship between the first user equipment and the second user equipment;

the transmitter is configured to send the timing information acquired by the processor to a base station;

the receiver is configured to receive a TA command sent by the base station, where the TA command is acquired by the base station according to the timing information; and the processor is further configured to adjust a signal sending time according to the TA command acquired by the receiver.

In a first possible implementation manner of the twelfth aspect, the timing information acquired by the processor includes: a link identifier of a link between the first user equipment and the second user equipment, and the timing relationship between the first user equipment and the second user equipment; and the TA command acquired by the receiver includes: the link identifier of the link between the first user equipment and the second user equipment, and a TA adjustment value of the link between the first user equipment and the second user equipment.

In a second possible implementation manner of the twelfth aspect, the timing information acquired by the processor includes: equipment identifiers of the first user equipment and the second user equipment, and the timing relationship between the first user equipment and the second user equipment; and the TA command acquired by the receiver includes: the equipment identifiers of the first user equipment and the second user equipment, and a TA adjustment value of a link between the first user equipment and the second user equipment.

With reference to any one of the twelfth aspect and the previous two possible implementation manners of the twelfth aspect, a third possible implementation manner of the twelfth aspect is provided, where the TA command acquired by the receiver further includes: a TA adjustment value of a link between the first user equipment and the base station.

According to a thirteenth aspect, user equipment is provided, including: a processor and a receiver, where the processor is configured to establish a D2D link to first user equipment;

the receiver is configured to receive a TA command sent by a base station, where the TA command is acquired by the base station according to timing information sent by the first user equipment, and the timing information is determined by the first user equipment and is used to identify a timing relationship between the first user equipment and the second user equipment; and the processor is further configured to adjust a signal sending time according to the TA command acquired by the receiver.

In a first possible implementation manner of the thirteenth aspect, the timing information includes: a link identifier of a link between the first user equipment and the second user equipment, and the timing relationship between the first user equipment and the second user equipment; and the TA command acquired by the receiver includes: the link identifier of the link between the first user equipment and the second user equipment, and a TA adjustment value of the link between the first user equipment and the second user equipment.

In a second possible implementation manner of the thirteenth aspect, the timing information includes: equipment identifiers of the first user equipment and the second user equipment, and the timing relationship between the first user equipment and the second user equipment; and the TA command acquired by the receiver includes: the equipment identifiers of the first user equipment and the second user equipment, and a TA adjustment value of a link between the first user equipment and the second user equipment.

With reference to any one of the thirteenth aspect and the previous two possible implementation manners of the thirteenth aspect, a third possible implementation manner of the thirteenth aspect is provided, where the TA command acquired by the receiver further includes: a TA adjustment value of a link between the second user equipment and the base station.

According to a fourteenth aspect, user equipment is provided, including: a processor and a transmitter, where the processor is configured to establish a D2D link to second user equipment, determine timing information between the user equipment and the second user equipment, and acquire a TA command according to the timing information, where the timing information is used to identify a timing relationship between the first user equipment and the second user equipment, and the TA command is used to adjust a signal sending time of the second user equipment; and the transmitter is configured to send the TA command acquired by the processor to the second user equipment.

In a first possible implementation manner of the fourteenth aspect, the timing information acquired by the processor includes: a link identifier of a link between the first user equipment and the second user equipment, and the timing relationship between the first user equipment and the second user equipment; and the processor is specifically configured to determine, according to the link identifier, that an object on which timing advance adjustment is to be performed is the second user equipment; acquire a TA adjustment value of a link between the first user equipment and the second user equipment according to the timing relationship between the first user equipment and the second user equipment; and generate the TA command, where the TA command includes: the link identifier of the link between the first user equipment and the second user equipment, and the TA adjustment value of the link between the first user equipment and the second user equipment.

In a second possible implementation manner of the fourteenth aspect, the timing information acquired by the processor includes: equipment identifiers of the first user equipment and the second user equipment, and the timing relationship between the first user equipment and the second user equipment; and the processor is specifically configured to determine, according to the equipment identifiers, that an object on which timing advance adjustment is to be performed is the second user equipment; acquire a TA adjustment value of a link between the first user equipment and the second user equipment according to the timing relationship between the first user equipment and the second user equipment; and generate the TA command, where the TA command includes: the equipment identifiers of the first user equipment and the second user equipment, and the TA adjustment value of the link between the first user equipment and the second user equipment.

With reference to any one of the fourteenth aspect and the previous two possible implementation manners of the fourteenth aspect, a third possible implementation manner of the fourteenth aspect is provided, where the transmitter is specifically configured to send the TA command to the second user equipment by using an interface between terminals.

With reference to any one of the fourteenth aspect and the previous three possible implementation manners of the fourteenth aspect, a fourth possible implementation manner of the fourteenth aspect is provided, where the user equipment further includes: a receiver, where the receiver is configured to: after the transmitter sends the TA command to the second user equipment, receive handshake signaling sent by the second user equipment.

With reference to the third possible implementation manner of the fourteenth aspect, a fifth possible implementation manner of the fourteenth aspect is provided, where the receiver is specifically configured to receive, by using the interface between the terminals, the handshake signaling sent by the second user equipment.

According to a fifteenth aspect, user equipment is provided, including: a receiver and a processor, where the processor is configured to establish a D2D link to first user equipment;

the receiver is configured to receive a TA command sent by the first user equipment, where the TA command is acquired by the first user equipment according to determined timing information, and the timing information is used to identify a timing relationship between the first user equipment and the second user equipment; and the processor is further configured to adjust a signal sending time according to the TA command acquired by the receiver.

In a first possible implementation manner of the fifteenth aspect, the timing information includes: a link identifier of a link between the first user equipment and the second user equipment, and the timing relationship between the first user equipment and the second user equipment; and the TA command acquired by the receiver includes: the link identifier of the link between the first user equipment and the second user equipment, and a TA adjustment value of the link between the first user equipment and the second user equipment.

In a second possible implementation manner of the fifteenth aspect, the timing information includes: equipment identifiers of the first user equipment and the second user equipment, and the timing relationship between the first user equipment and the second user equipment; and the TA command acquired by the receiver includes: the equipment identifiers of the first user equipment and the second user equipment, and a TA adjustment value of a link between the first user equipment and the second user equipment.

With reference to any one of the fifteenth aspect and the previous two possible implementation manners of the fifteenth aspect, a third possible implementation manner of the fifteenth aspect is provided, where the receiver is specifically configured to receive, by using an interface between terminals, the TA command sent by the first user equipment.

With reference to any one of the fifteenth aspect and the previous three possible implementation manners of the fifteenth aspect, a fourth possible implementation manner of the fifteenth aspect is provided, where the user equipment further includes: a transmitter, where the transmitter is configured to: after the receiver receives the TA command sent by the first user equipment, send handshake signaling to the first user equipment.

With reference to the fourth possible implementation manner of the fifteenth aspect, a fifth possible implementation manner of the fifteenth aspect is provided, where the transmitter is specifically configured to send the handshake signaling to the first user equipment by using the interface between the terminals.

According to the timing advance adjustment method and device that are provided by the embodiments of the present invention, a base station generates a TA command according to timing information sent by user equipment, or user equipment generates a TA command according to timing information between the user equipment and another user equipment, to perform TA adjustment on a D2D link between the user equipments and a link between the user equipment and the base station, so that precise timing synchronization is achieved between the user equipments, and the user equipment can correctly extract data to correctly decode the data, thereby improving a system throughput.

BRIEF DESCRIPTION OF DRAWINGS

To describe the technical solutions in the embodiments of the present invention more clearly, the following briefly introduces the accompanying drawings required for describing the embodiments or the prior art. Apparently, the accompanying drawings in the following description show merely some embodiments of the present invention, and persons of ordinary skill in the art may still derive other drawings from these accompanying drawings without creative efforts.

DESCRIPTION OF EMBODIMENTS

The following clearly describes the technical solutions in the embodiments of the present invention with reference to the accompanying drawings in the embodiments of the present invention. Apparently, the described embodiments are merely some but not all of the embodiments of the present invention. All other embodiments obtained by persons of ordinary skill in the art based on the embodiments of the present invention without creative efforts shall fall within the protection scope of the present invention.

Figure 1:
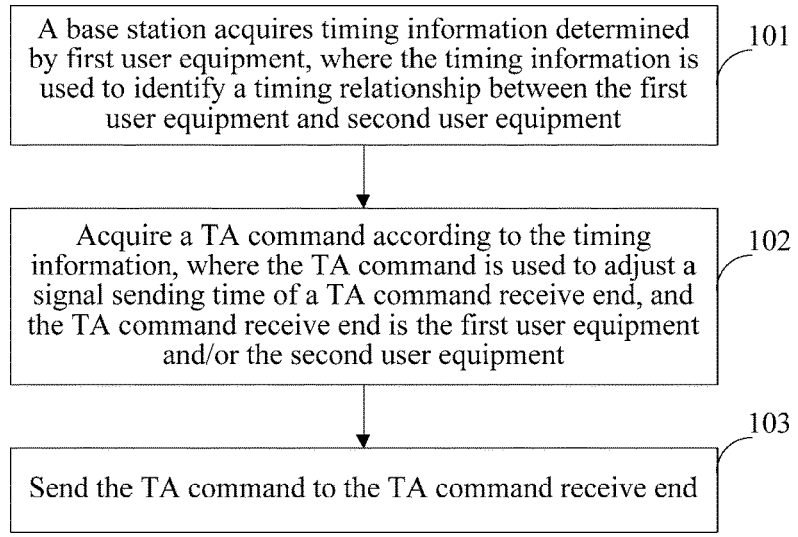
FIG. 1 is a schematic diagram of a timing advance adjustment method according to an embodiment of the present invention.

As shown in FIG. 1, the present invention provides a timing advance adjustment method, including:

Step 101: A base station acquires timing information determined by first user equipment, where the timing information is used to identify a timing relationship between the first user equipment and second user equipment.

The acquiring, by a base station, timing information determined by first user equipment may be sending, by the first user equipment, the determined timing information to the base station, or may be acquiring, by the base station by monitoring the first user equipment, the determined timing information, which is certainly not limited thereto.

Specifically, a D2D link may exist between the first user equipment and at least one user equipment (each user equipment that establishes a D2D link to the first user equipment may be referred to as second user equipment), and a timing relationship exists between the first user equipment the at least one user equipment. Therefore, the first user equipment may pack timing information between the first user equipment and the at least one user equipment and send the timing information to the base station, and correspondingly, the base station receives the timing information sent by the first user equipment. Alternatively, the base station may acquire timing information between the first user equipment and the at least one user equipment by monitoring the first user equipment.

Further, the timing information determined by the first user equipment may be implemented in multiple manners, and the timing information may also be acquired by both the first user equipment and the second user equipment.

Optionally, the first user equipment sends a reference signal to the second user equipment, and the second user equipment receives and parses the reference signal, so that the first user equipment and the second user equipment separately acquire the timing relationship between the first user equipment and the second user equipment.

Optionally, the first user equipment sends a synchronization signal to the second user equipment, and the second user equipment receives and parses the synchronization signal, so that the first user equipment and the second user equipment separately acquire the timing relationship between the first user equipment and the second user equipment.

Acquiring the timing relationship between the first user equipment and the second user equipment is not limited to the method described above.

Optionally, the timing information determined by the first user equipment may include: a link identifier of a link between the first user equipment and the second user equipment, and the timing relationship between the first user equipment and the second user equipment, or optionally, equipment identifiers of the first user equipment and the second user equipment, and the timing relationship between the first user equipment and the second user equipment.

Step 102: Acquire a TA command according to the timing information, where the TA command is used to adjust a signal sending time of a TA command receive end, and the TA command receive end is the first user equipment and/or the second user equipment.

Because the timing information acquired by the base station includes different content, the base station acquires different TA commands according to the different timing information that is acquired. The acquiring, by the base station, a TA command according to the timing information is described in detail below.

Optionally, if the timing information includes: a link identifier of a link between the first user equipment and the second user equipment, and the timing relationship between the first user equipment and the second user equipment, the acquiring a TA command according to the timing information includes:

determining, according to the link identifier, that objects/an object on which timing advance adjustment is to be performed are/is the first user equipment and/or the second user equipment;

acquiring a TA adjustment value of the link between the first user equipment and the second user equipment according to the timing relationship between the first user equipment and the second user equipment, a timing relationship between the base station and the first user equipment, and a timing relationship between the base station and the second user equipment; and generating the TA command, where the TA command includes: the link identifier of the link between the first user equipment and the second user equipment, and the TA adjustment value of the link between the first user equipment and the second user equipment.

When the base station determines, according to the link identifier, that the object on which timing advance adjustment is to be performed is the first user equipment, that is, the TA command receive end is the first user equipment, the first user equipment adjusts the signal sending time according to the received TA command. When the base station determines, according to the link identifier, that the object on which timing advance adjustment is to be performed is the second user equipment, that is, the TA command receive end is the second user equipment, the second user equipment adjusts the signal sending time according to the received TA command. When the base station determines, according to the link identifier, that the objects on which timing advance adjustment is to be performed are the first user equipment and the second user equipment, that is, TA command receive ends are the first user equipment and the second user equipment, the first user equipment and the second user equipment adjust the signal sending time according to the received TA command. The adjustment may be that the first user equipment delays sending a signal to the second user equipment, and the second user equipment sends a signal to the first user equipment in advance, or may be that the first user equipment sends a signal to the second user equipment in advance and the second user equipment delays sending a signal to the first user equipment.

Specifically, a representation form of the TA command may be: a link identifier (ID)+a TA adjustment value, where the link ID is used to differentiate D2D links, and the TA adjustment value is used to identify a timing advance adjustment value of a D2D link.

Optionally, the TA adjustment value may be a relative time or may be an absolute time. That is, a signal may be sent a time period, indicated by the TA adjustment value, before or after a previous signal sending time, or a signal may be sent at a time indicated by the TA adjustment value.

Exemplarily, assuming that UE 1 is the first user equipment, UE 2 is the second user equipment, and a D2D link is established between the UE 1 and the UE 2, a link identifier of the D2D link established between the UE 1 and the UE 2 is denoted as 1, and certainly, the link identifier of the link between the UE 1 and the UE 2 may also be denoted in any other form, which shall all fall within the protection scope of the embodiments of the present invention.

Optionally, if the timing information includes: equipment identifiers of the first user equipment and the second user equipment, and the timing relationship between the first user equipment and the second user equipment, the acquiring a TA command according to the timing information includes:

determining, according to the equipment identifiers, that objects/an object on which timing advance adjustment is to be performed are/is the first user equipment and/or the second user equipment;

acquiring a TA adjustment value of a link between the first user equipment and the second user equipment according to the timing relationship between the first user equipment and the second user equipment, a timing relationship between the base station and the first user equipment, and a timing relationship between the base station and the second user equipment; and generating the TA command, where the TA command includes: the equipment identifiers of the first user equipment and the second user equipment, and the TA adjustment value of the link between the first user equipment and the second user equipment.

The timing information includes the equipment identifier of the first user equipment and the equipment identifier of the second user equipment, and each of the first user equipment and the second user equipment has a respective equipment identifier; the respective equipment identifiers of the first user equipment and the second user equipment may be the same or may be different.

When the base station determines, according to the equipment identifiers, that the object on which timing advance adjustment is to be performed is the first user equipment, that is, the TA command receive end is the first user equipment, the first user equipment adjusts the signal sending time according to the received TA command. When the base station determines, according to the equipment identifiers, that the object on which timing advance adjustment is to be performed is the second user equipment, that is, the TA command receive end is the second user equipment, the second user equipment adjusts the signal sending time according to the received TA command. When the base station determines, according to the equipment identifiers, that the objects on which timing advance adjustment is to be performed are the first user equipment and the second user equipment, that is, TA command receive ends are the first user equipment and the second user equipment, the first user equipment and the second user equipment adjust the signal sending time according to the received TA command. The adjustment may be that the first user equipment delays sending a signal to the second user equipment, and the second user equipment sends a signal to the first user equipment in advance, or may be that the first user equipment sends a signal to the second user equipment in advance and the second user equipment delays sending a signal to the first user equipment.

Specifically, a representation form of the TA command may be a UE ID+a TA adjustment value, where the UE ID is used to differentiate D2D links, and the TA adjustment value is used to identify the timing advance adjustment value of the link between the first user equipment and the second user equipment.

Optionally, the TA adjustment value may be a relative time or may be an absolute time. That is, a signal may be sent a time period, indicated by the TA adjustment value, before or after a previous signal sending time, or a signal may be sent at a time indicated by the TA adjustment value.

Exemplarily, assuming that UE 1 is the first user equipment, the equipment identifier of the first user equipment may be indicated by UE 1, UE 2 is the second user equipment, the equipment identifier of the second user equipment may be indicated by UE 2, and a D2D link is established between the UE 1 and the UE 2, the D2D link established between the UE 1 and the UE 2 may be denoted as UE 1⇆UE 2, and certainly, an link between the UE 1 and the UE 2 may also be denoted in any other form according to different equipment identifiers of the UE 1 and the UE 2, which shall all fall within the protection scope of the embodiments of the present invention.

Step 103: Send the TA command to the TA command receive end.

If the TA command receive end is the first user equipment, the TA command is sent to the first user equipment, so that the first user equipment adjusts, according to the received TA command, a signal sending time on the link between the first user equipment and the second user equipment, and synchronization of signal sending and signal receiving between the first user equipment and the second user equipment is achieved according to the adjusted time. If the TA command receive end is the second user equipment, the TA command is sent to the second user equipment, so that the second user equipment adjusts, according to the received TA command, a signal sending time on the link between the second user equipment and the first user equipment, and synchronization of signal sending and signal receiving between the first user equipment and the second user equipment is achieved according to the adjusted time. If the TA command receive ends are the first user equipment and the second user equipment, the TA command is sent to the first user equipment and the second user equipment, so that the first user equipment and the second user equipment adjust, according to the received TA command, signal sending times of the first user equipment and the second user equipment, and synchronization of signal sending and signal receiving between the first user equipment and the second user equipment is achieved according to the adjusted times.

Further, the TA command further includes: a TA adjustment value of a link between the TA command receive end and the base station.

Specifically, the TA command receive end sends a signal to the base station, and the base station receives signals sent by different TA command receive ends. Because times at which the base station receives the signals sent by the different TA command receive ends are not the same, in order to simultaneously receive the signals sent by the different TA command receive ends, the base station adjusts, according to the received signals sent by the different TA command receive ends, signal sending times of the different TA command receive ends. If a time at which the base station receives a signal sent by a TA command receive end is advanced, a signal sending time of the TA command receive end is delayed; if a time at which the base station receives a signal sent by a TA command receive end is delayed, a signal sending time of the TA command receive end is advanced, so that the signals sent by the different TA command receive ends arrive at the base station at the same time.

Exemplarily, if UE 1 is the first user equipment, and UE 2 is the second user equipment, the UE 1 and the UE 2 establish a D2D link. If the TA command receive end is the UE 1, the TA command may include a link identifier of the D2D link between the UE 1 and the UE 2, and a TA adjustment value of the D2D link between the UE 1 and the UE 2, and may further include a TA adjustment value of a link between the UE 1 and the base station. If the TA command receive end UE 2, the TA command may include the link identifier of the D2D link between the UE 2 and the UE 1, and the TA adjustment value of the D2D link between the UE 2 and the UE 1, and may further include a TA adjustment value of a link between the UE 2 and the base station.

According to the timing advance adjustment method that is provided by this embodiment of the present invention, a base station generates a TA command according to timing information sent by user equipment, to perform TA adjustment on a D2D link between user equipments and a link between the user equipment and the base station, so that precise timing synchronization is achieved between the user equipments, and the user equipment can correctly extract data to correctly decode the data, thereby improving a system throughput.

Figure 2:
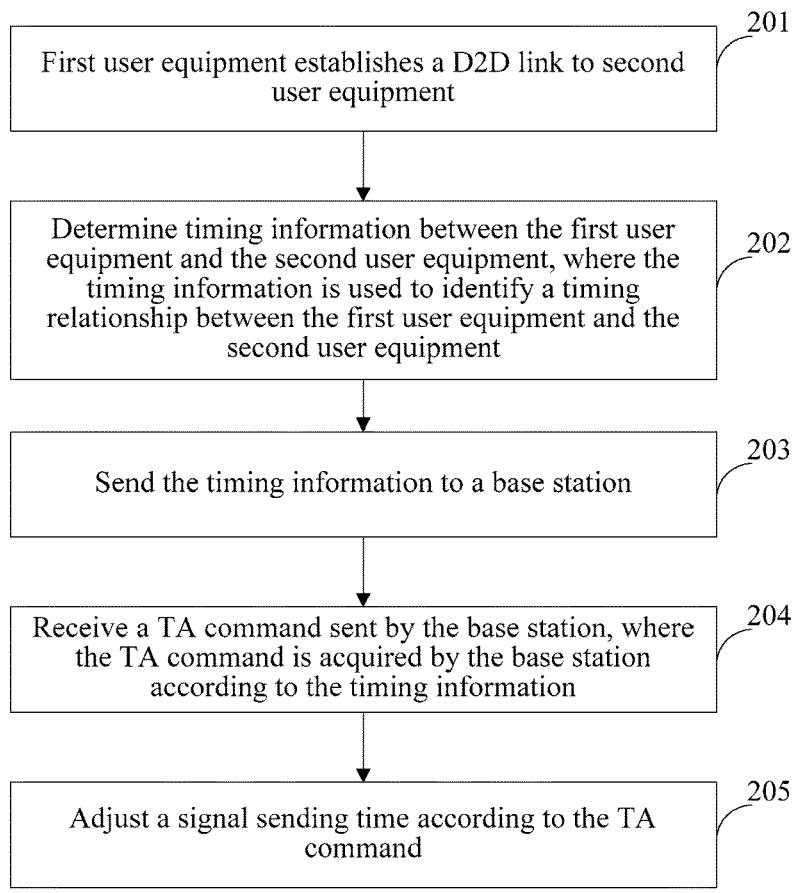
FIG. 2 is a schematic diagram of another timing advance adjustment method according to an embodiment of the present invention.

As shown in FIG. 2, the present invention provides a timing advance adjustment method, including:

Step 201: First user equipment establishes a D2D link to second user equipment.

The establishing, by first user equipment, a D2D link to second user equipment may be specifically: if the first user equipment needs to perform data transmission with the second user equipment, first sending, by the first user equipment, information to a base station; learning, by the base station according to the information sent by the first user equipment, that the first user equipment needs to perform data transmission with the second user equipment; and if the base station finds that the first user equipment and the second user equipment are in a same D2D cluster, notifying, by the base station, the first user equipment that the first user equipment can establish a D2D link to the second user equipment, so as to directly perform data communication. In this case, the first user equipment establishes the D2D link to the second user equipment.

Step 202: Determine timing information between the first user equipment and the second user equipment, where the timing information is used to identify a timing relationship between the first user equipment and the second user equipment.

Each user equipment that establishes a D2D link to the first user equipment may be referred to as the second user equipment; therefore, the timing relationship between the first user equipment and the second user equipment may be implemented in multiple manners, and the timing information may be acquired by both the first user equipment and the second user equipment.

Optionally, the first user equipment sends a reference signal to the second user equipment, and the second user equipment receives and parses the reference signal, so that the first user equipment and the second user equipment separately acquire the timing relationship between the first user equipment and the second user equipment.

Optionally, the first user equipment sends a synchronization signal to the second user equipment, and the second user equipment receives and parses the synchronization signal, so that the first user equipment and the second user equipment separately acquire the timing relationship between the first user equipment and the second user equipment.

The timing information of the D2D link between the first user equipment and the second user equipment is certainly not limited to the foregoing two methods.

Optionally, the timing information includes: a link identifier of a link between the first user equipment and the second user equipment, and the timing relationship between the first user equipment and the second user equipment.

Optionally, the timing information includes: equipment identifiers of the first user equipment and the second user equipment, and the timing relationship between the first user equipment and the second user equipment.

Step 203: Send the timing information to a base station.

Step 204: Receive a TA command sent by the base station, where the TA command is acquired by the base station according to the timing information.

Optionally, if the timing information includes a link identifier of a link between the first user equipment and the second user equipment, and the timing relationship between the first user equipment and the second user equipment, the TA command includes: the link identifier of the link between the first user equipment and the second user equipment, and a TA adjustment value of the link between the first user equipment and the second user equipment.

Optionally, if the timing information includes equipment identifiers of the first user equipment and the second user equipment, and the timing relationship between the first user equipment and the second user equipment, the TA command includes: the equipment identifiers of the first user equipment and the second user equipment, and a TA adjustment value of a link between the first user equipment and the second user equipment.

Step 205: Adjust a signal sending time according to the TA command.

The first user equipment adjusts the signal sending time according to the TA command, so that a time at which a signal sent by the first user equipment arrives at the second user equipment is the same as a time at which a signal sent by another device arrives at the second user equipment.

Further, the TA command further includes: a TA adjustment value of a link between the first user equipment and the base station.

Specifically, the first user equipment sends a signal to the base station, the base station receives the signal sent by the first user equipment, and in order to simultaneously receive signals sent by different user equipments, the base station adjusts the signal sending time of the first user equipment. If a time at which the base station receives the signal sent by the first user equipment is advanced, the signal sending time of the first user equipment is delayed; if a time at which the base station receives the signal sent by the first user equipment is delayed, the signal sending time of the first user equipment is advanced, so that a time at which the signal sent by the first user equipment arrives at the base station is the same as a time at which a signal sent by another device arrives at the base station.

According to the timing advance adjustment method that is provided by this embodiment of the present invention, user equipment establishes a D2D link to another user equipment, determines timing information of different D2D links, and sends the timing information to a base station; and the base station generates a TA command according to the timing information sent by the user equipment, to perform TA adjustment on the D2D link between the user equipments and a link between the user equipment and the base station, so that precise timing synchronization is achieved between the user equipments, and the user equipment can correctly extract data to correctly decode the data, thereby improving a system throughput.

Figure 3:
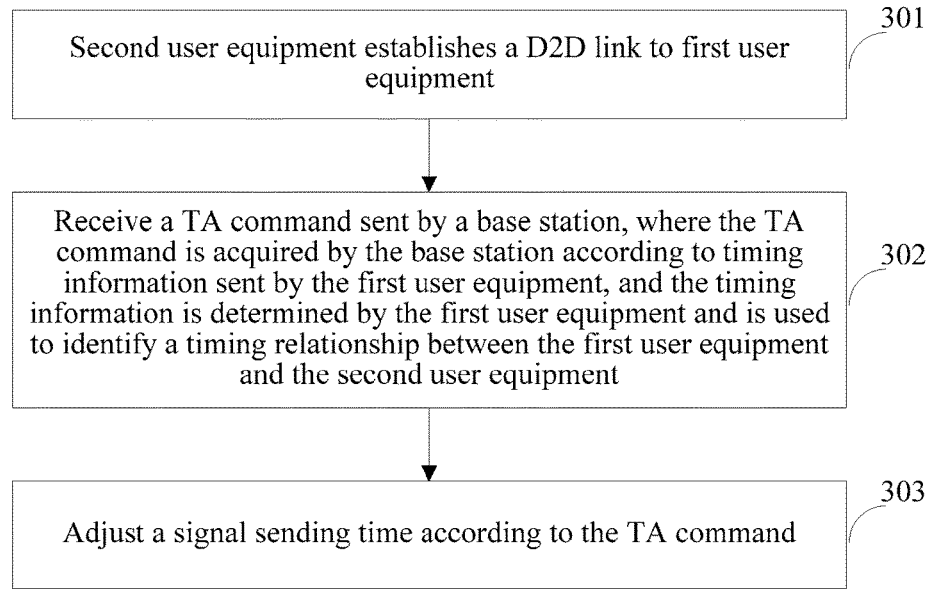
FIG. 3 is a schematic diagram of another timing advance adjustment method according to an embodiment of the present invention.

As shown in FIG. 3, the present invention provides a timing advance adjustment method, including:

Step 301: Second user equipment establishes a D2D link to first user equipment.

The establishing, by second user equipment, a D2D link to first user equipment may be specifically: if the second user equipment needs to perform data transmission with the first user equipment, first sending, by the second user equipment, information to a base station; learning, by the base station according to the information sent by the second user equipment, that the second user equipment needs to perform data transmission with the first user equipment; and if the base station finds that the first user equipment and the second user equipment are in a same D2D cluster, notifying, by the base station, the second user equipment that the second user equipment can establish a D2D link to the first user equipment, so as to directly perform data communication. In this case, the second user equipment establishes the D2D link to the first user equipment.

Step 302: Receive a TA command sent by a base station, where the TA command is acquired by the base station according to timing information sent by the first user equipment, and the timing information is determined by the first user equipment and is used to identify a timing relationship between the first user equipment and the second user equipment.

Optionally, the timing information includes: a link identifier of a link between the first user equipment and the second user equipment, and the timing relationship between the first user equipment and the second user equipment; and the TA command includes: the link identifier of the link between the first user equipment and the second user equipment, and a TA adjustment value of the link between the first user equipment and the second user equipment.

Optionally, the timing information includes: equipment identifiers of the first user equipment and the second user equipment, and the timing relationship between the first user equipment and the second user equipment; and the TA command includes: the equipment identifiers of the first user equipment and the second user equipment, and a TA adjustment value of a link between the first user equipment and the second user equipment.

Step 303: Adjust a signal sending time according to the TA command.

The second user equipment adjusts the signal sending time according to the TA command, so that a time at which a signal sent by the second user equipment arrives at the first user equipment is the same as a time at which a signal sent by another device arrives at the first user equipment.

Optionally, after step 301, the timing advance adjustment method further includes: determining the timing information of the link between the second user equipment and the first user equipment.

The timing relationship between the first user equipment and the second user equipment may be implemented in multiple manners, and the timing information may be acquired by both the first user equipment and the second user equipment.

Optionally, the first user equipment sends a reference signal to the second user equipment, and the second user equipment receives and parses the reference signal, so that the first user equipment and the second user equipment separately acquire the timing relationship between the first user equipment and the second user equipment.

Optionally, the first user equipment sends a synchronization signal to the second user equipment, and the second user equipment receives and parses the synchronization signal, so that the first user equipment and the second user equipment separately acquire the timing relationship between the first user equipment and the second user equipment.

The timing information of the D2D link between the first user equipment and the second user equipment is certainly not limited to the foregoing two methods.

Optionally, the TA command further includes: a TA adjustment value of a link between the second user equipment and the base station.

Specifically, the second user equipment sends a signal to the base station, the base station receives the signal sent by the second user equipment, and in order to simultaneously receive signals sent by different user equipments, the base station adjusts the signal sending time of the second user equipment. If a time at which the base station receives the signal sent by the second user equipment is advanced, the signal sending time of the second user equipment is delayed; and if a time at which the base station receives the signal sent by the second user equipment is delayed, the signal sending time of the second user equipment is advanced, so that a time at which the signal sent by the second user equipment arrives at the base station is the same as a time at which a signal sent by another device arrives at the base station.

According to the timing advance adjustment method that is provided by this embodiment of the present invention, user equipment establishes a D2D link to first user equipment, and receives a TA command sent by a base station, to perform TA adjustment on the D2D link between the user equipment and the first user equipment and a link between the user equipment and the base station, so that precise timing synchronization is achieved between the user equipments, and the user equipment can correctly extract data to correctly decode the data, thereby improving a system throughput.

Figure 4:
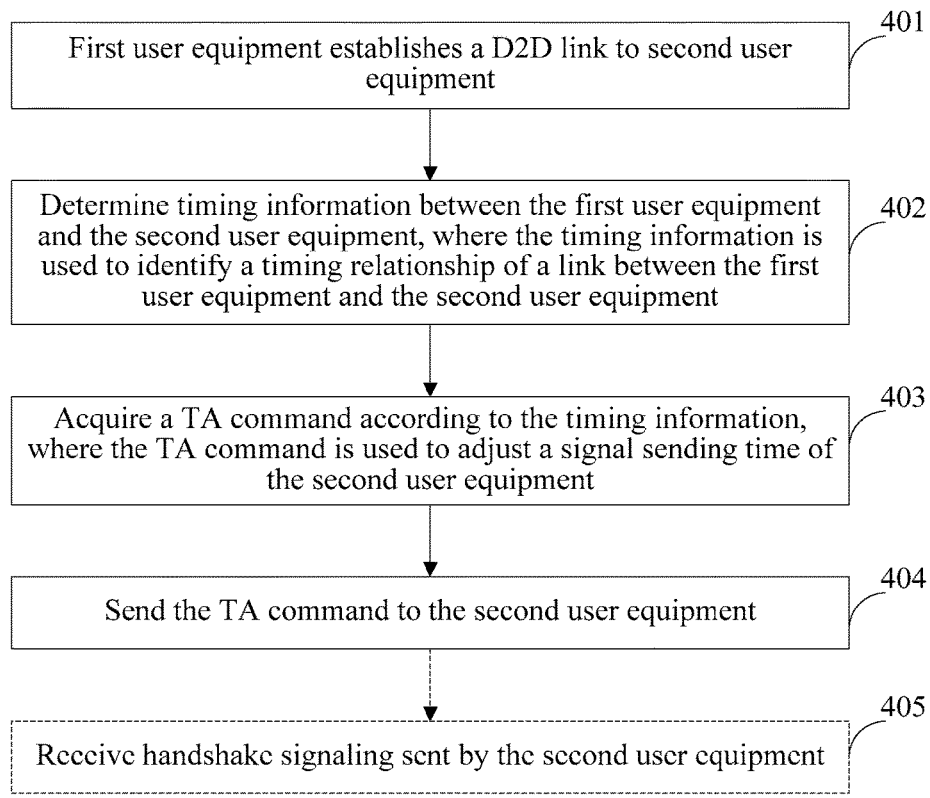
FIG. 4 is a schematic diagram of another timing advance adjustment method according to an embodiment of the present invention.

As shown in FIG. 4, the present invention provides a timing advance adjustment method, including:

Step 401: First user equipment establishes a D2D link to second user equipment.

The establishing, by first user equipment, a D2D link to second user equipment may be specifically: if the first user equipment needs to perform data transmission with the second user equipment, first sending, by the first user equipment, information to a base station; learning, by the base station according to the information sent by the first user equipment, that the first user equipment needs to perform data transmission with the second user equipment; and if the base station finds that the first user equipment and the second user equipment are in a same D2D cluster, notifying, by the base station, the first user equipment that the first user equipment can establish a D2D link to the second user equipment, so as to directly perform data communication. In this case, the first user equipment establishes the D2D link to the second user equipment.

Step 402: Determine timing information between the first user equipment and the second user equipment, where the timing information is used to identify a timing relationship between the first user equipment and the second user equipment.

The first user equipment may determine the timing information between the first user equipment and the second user equipment in multiple manners, and the timing information may be acquired by both the first user equipment and the second user equipment.

Optionally, the first user equipment sends a reference signal to the second user equipment, and the second user equipment receives and parses the reference signal, so that the first user equipment and the second user equipment separately acquire the timing relationship between the first user equipment and the second user equipment.

Optionally, the first user equipment sends a synchronization signal to the second user equipment, and the second user equipment receives and parses the synchronization signal, so that the first user equipment and the second user equipment separately acquire the timing relationship of the related D2D link between the first user equipment and the second user equipment.

The timing information of the D2D link between the first user equipment and the second user equipment is certainly not limited to the foregoing two methods.

Optionally, the timing information includes: a link identifier of a link between the first user equipment and the second user equipment, and the timing relationship between the first user equipment and the second user equipment.

Optionally, the timing information includes: equipment identifiers of the first user equipment and the second user equipment, and the timing relationship between the first user equipment and the second user equipment.

Step 403: Acquire a TA command according to the timing information, where the TA command is used to adjust a signal sending time of the second user equipment.

As can be known according to step 402, the timing information acquired by the first user equipment includes different content; therefore, the first user equipment acquires different TA commands according to the different timing information that is acquired. The acquiring, by the first user equipment, a TA command according to the timing information is described in detail below.

Optionally, if the timing information includes: an identifier of a link between the first user equipment and the second user equipment, and the timing relationship between the first user equipment and the second user equipment, the acquiring a TA command according to the timing information includes:

determining, according to the link identifier, that an object on which timing advance adjustment is to be performed is the second user equipment;

acquiring a TA adjustment value of a link between the first user equipment and the second user equipment according to the timing relationship between the first user equipment and the second user equipment; and generating the TA command, where the TA command includes: the link identifier of the link between the first user equipment and the second user equipment, and the TA adjustment value of the link between the first user equipment and the second user equipment.

A representation form of the TA command may be: a link ID+a TA adjustment value, where the link ID is used to differentiate links, and the TA adjustment value is used to identify a timing advance adjustment value of the link.

Optionally, if the timing information includes: equipment identifiers of the first user equipment and the second user equipment, and the timing relationship between the first user equipment and the second user equipment, the acquiring a TA command according to the timing information includes:

determining, according to the equipment identifiers, that an object on which timing advance adjustment is to be performed is the second user equipment;

acquiring a TA adjustment value of a link between the first user equipment and the second user equipment according to the timing relationship between the first user equipment and the second user equipment; and generating the TA command, where the TA command includes: the equipment identifiers of the first user equipment and the second user equipment, and the TA adjustment value of the link between the first user equipment and the second user equipment.

A representation form of the TA command may be: a UE ID+a TA adjustment value, where the UE ID is used to differentiate D2D links, and the TA adjustment value is used to identify a timing advance adjustment value of the D2D link.

Certainly, the representation form of the TA command is not limited to the foregoing two specific representation forms.

Step 404: Send the TA command to the second user equipment.

In an existing protocol, a TA command is not transmitted by using an interface between terminals between user equipments, and in this embodiment of the present invention, the TA command is transmitted by using an interface between terminals between the first user equipment and the second user equipment; therefore, the first user equipment sends the TA command to the second user equipment by using the interface between the terminals.

If the second user equipment needs to reply when receiving the TA command sent by the first user equipment, step 405 is performed.

Step 405: Receive handshake signaling sent by the second user equipment.

The first user equipment receives, by using the interface between the terminals, the handshake signaling sent by the second user equipment.

According to the timing advance adjustment method that is provided by this embodiment of the present invention, user equipment establishes a D2D link to another user equipment, and generates a TA command according to timing information between the user equipment and the another user equipment, to perform TA adjustment on the D2D link between the user equipments, so that precise timing synchronization is achieved between the user equipments, and the user equipment can correctly extract data to correctly decode the data, thereby improving a system throughput.

Figure 5:
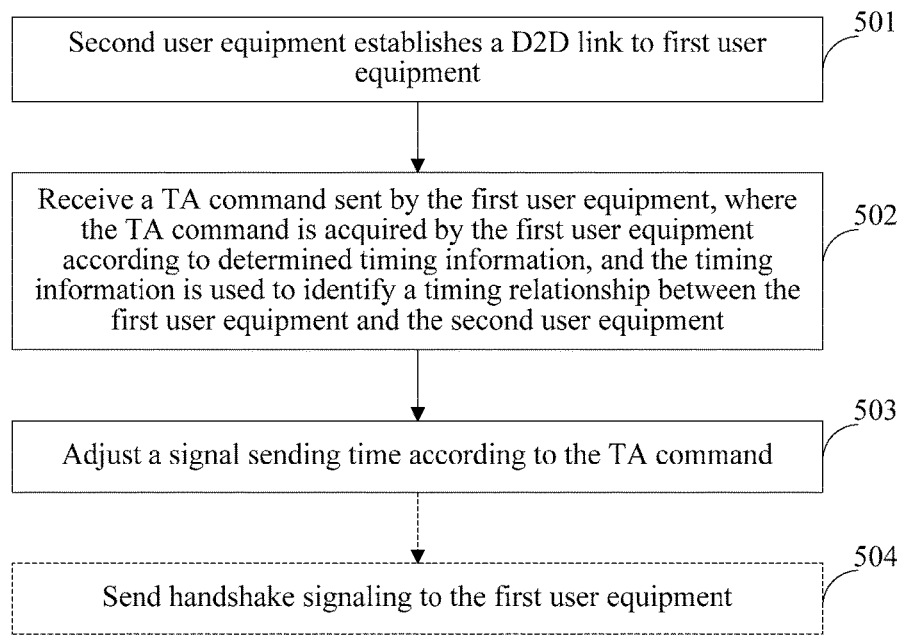
FIG. 5 is a schematic diagram of another timing advance adjustment method according to an embodiment of the present invention.

As shown in FIG. 5, the present invention provides a timing advance adjustment method, including:

Step 501: Second user equipment establishes a D2D link to first user equipment.

The establishing, by second user equipment, a D2D link to first user equipment may be specifically: if the second user equipment needs to perform data transmission with the first user equipment, first sending, by the second user equipment, information to a base station; learning, by the base station according to the information sent by the second user equipment, that the second user equipment needs to perform data transmission with the first user equipment; and if the base station finds that the first user equipment and the second user equipment are in a same D2D cluster, notifying, by the base station, the second user equipment that the second user equipment can establish a D2D link to the first user equipment, so as to directly perform data communication. In this case, the second user equipment establishes the D2D link to the first user equipment.

Optionally, after establishing the D2D link to the first user equipment, the second user equipment determines timing information between the second user equipment and the first user equipment.

A timing relationship between the first user equipment and the second user equipment may be implemented in multiple manners, and the timing information may be acquired by both the first user equipment and the second user equipment.

Optionally, the first user equipment sends a reference signal to the second user equipment, and the second user equipment receives and parses the reference signal, so that the first user equipment and the second user equipment separately acquire the timing relationship between the first user equipment and the second user equipment.

Optionally, the first user equipment sends a synchronization signal to the second user equipment, and the second user equipment receives and parses the synchronization signal, so that the first user equipment and the second user equipment separately acquire the timing relationship between the first user equipment and the second user equipment.

The timing information of the D2D link between the first user equipment and the second user equipment is certainly not limited to the foregoing two methods.

Step 502: Receive a TA command sent by the first user equipment, where the TA command is acquired by the first user equipment according to determined timing information, and the timing information is used to identify a timing relationship between the first user equipment and the second user equipment.

Optionally, the timing information includes: a link identifier of a link between the first user equipment and the second user equipment, and the timing relationship between the first user equipment and the second user equipment; and the TA command includes: the link identifier of the link between the first user equipment and the second user equipment, and a TA adjustment value of the link between the first user equipment and the second user equipment.

Optionally, the timing information includes: equipment identifiers of the first user equipment and the second user equipment, and the timing relationship between the first user equipment and the second user equipment; and the TA command includes: the equipment identifiers of the first user equipment and the second user equipment, and a TA adjustment value of a link between the first user equipment and the second user equipment.

Optionally, in an existing protocol, a TA command is not transmitted by using an interface between terminals between user equipments, and in this embodiment of the present invention, the TA command is transmitted by using an interface between terminals between the first user equipment and the second user equipment; therefore, the second user equipment receives, by using the interface between the terminals, the TA command sent by the first user equipment.

Step 503: Adjust a signal sending time according to the TA command.

If the second user equipment needs to reply when receiving the TA command sent by the first user equipment, step 504 is performed.

Step 504: Send handshake signaling to the first user equipment.

The second user equipment sends the handshake signaling to the first user equipment by using the interface between the terminals.

According to the timing advance adjustment method that is provided by this embodiment of the present invention, user equipment establishes a D2D link to first user equipment, and receives a TA command that is generated by the first user equipment according to timing information between the first user equipment and the user equipment, to perform TA adjustment on the D2D link between the user equipments, so that precise timing synchronization is achieved between the user equipments, and the user equipment can correctly extract data to correctly decode the data, thereby improving a system throughput.

Figure 6:
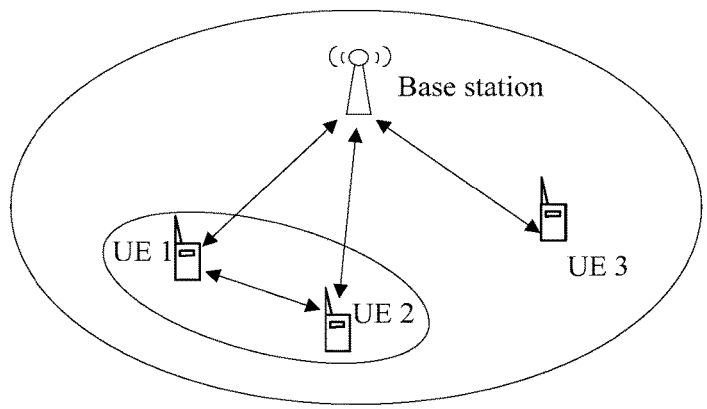
FIG. 6 is a schematic diagram of a structure of a system of a D2D link according to an embodiment of the present invention.

The present invention further provides specific embodiments below to describe the foregoing timing advance adjustment method in detail. As shown in FIG. 6, UE 1 and UE 2 are in a same D2D cluster, UE 3 is not in the D2D cluster that the UE 1 and the UE 2 are in, different D2D clusters are divided by a base station, and a D2D cluster remains unchanged after division.

Embodiment 1

Figure 7:
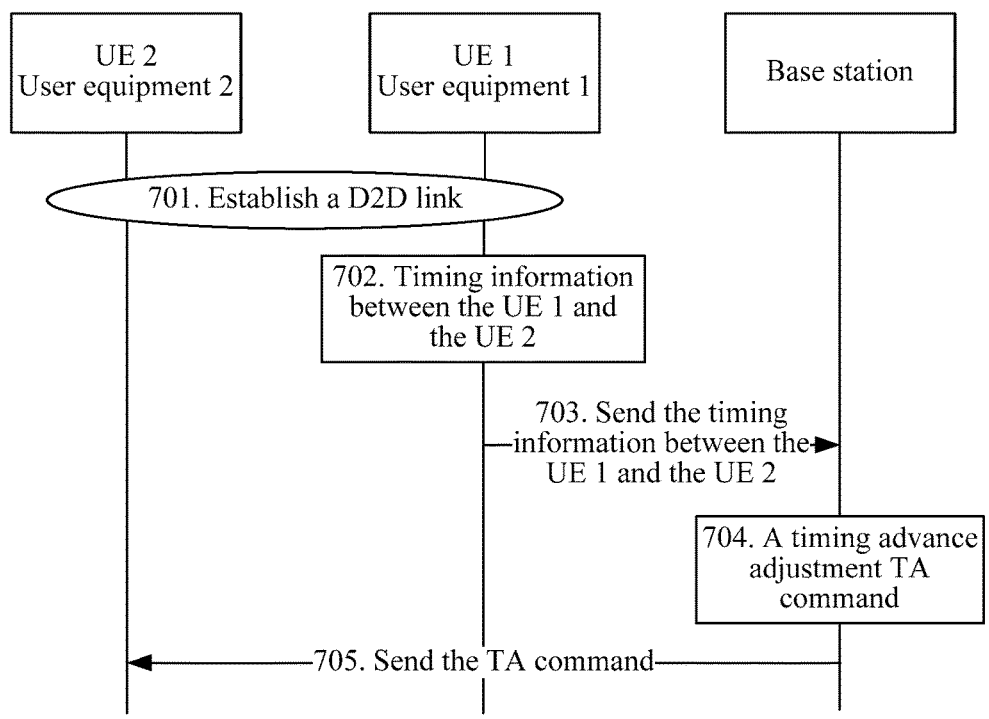
FIG. 7 is a schematic flowchart of a timing advance adjustment method according to an embodiment of the present invention.

Based on the foregoing scenario, the timing advance adjustment method is described in detail below, and the method may be applied to a case in which UE 1 and UE 2 remain unchanged, or may be applied to a case in which UE 1 and UE 2 relatively move, but the solution is preferably used in the case in which the UE 1 and the UE 2 remain unchanged, which, as shown in FIG. 7, includes:

Step 701: UE 2 establishes a D2D link to UE 1.

Specifically, if the UE 2 needs to perform data transmission with the UE 1, first, the UE 2 sends information to a base station; the base station learns, according to the information sent by the UE 2, that the UE 2 needs to perform data transmission with the UE 1; and if the base station finds that the UE 1 and the UE 2 are in a same D2D cluster, the base station notifies the UE 2 that the UE 2 can establish a D2D link to the UE 1, so as to directly perform data communication. In this case, the UE 2 establishes the D2D link to the UE 1, and establishes a timing relationship between the UE 2 and the UE 1.

In a timing process between the UE 2 and the UE 1, the UE 1 sends a sounding reference signal (SRS) to the UE 2, and the UE 2 receives an SRS sequence, so that the UE 1 and the UE 2 separately acquire the timing relationship between the UE 1 and the UE 2.

Step 702: The UE 1 acquires timing information between the UE 1 and the UE 2.

Step 703: The UE 1 sends the timing information between the UE 1 and the UE 2 to a base station; and correspondingly, the base station receives the timing information between the UE 1 and the UE 2.

Step 704: The base station generates a TA command according to the timing information between the UE 1 and the UE 2.

The TA command includes a TA adjustment value of the D2D link between the UE 1 and the UE 2.

Step 705: The base station sends the TA command to the UE 2; and correspondingly, the UE 2 receives the TA command sent by the base station, so as to perform data transmission by using a TA adjustment value included in the TA command.

The TA command may include the TA adjustment value of the D2D link between the UE 1 and the UE 2, and may further include a TA adjustment value of a link between the UE 2 and the base station.

According to the timing advance adjustment method that is provided by this embodiment of the present invention, a base station generates a TA command according to timing information sent by user equipment, to perform TA adjustment on a D2D link between user equipments and a link between the user equipment and the base station, so that precise timing synchronization is achieved between the user equipments, and the user equipment can correctly extract data to correctly decode the data, thereby improving a system throughput.

Embodiment 2

Figure 8:
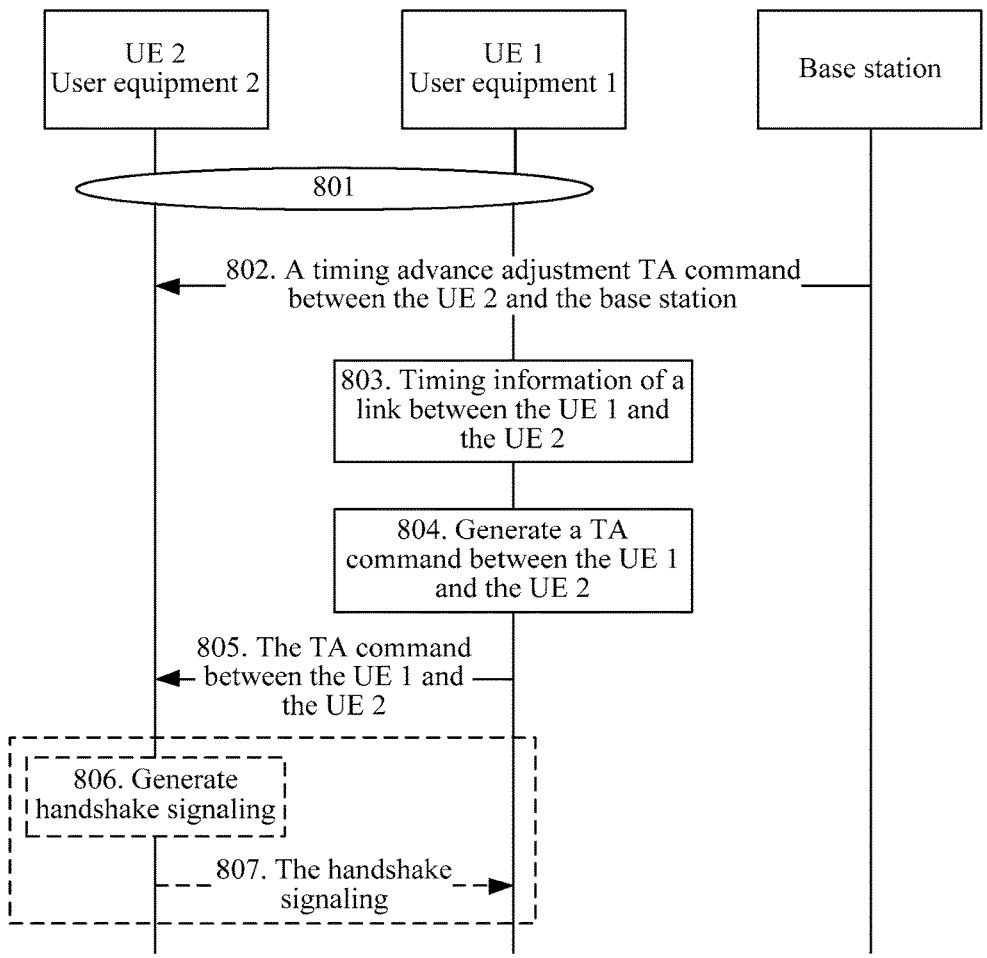
FIG. 8 is a schematic flowchart of another timing advance adjustment method according to an embodiment of the present invention.

Based on the foregoing scenario, the timing advance adjustment method is described in detail below, and the method may be applied to a case in which UE 1 and UE 2 remain unchanged, or may be applied to a case in which UE 1 and UE 2 relatively move, but the solution is preferably used in the case in which the UE 1 and the UE 2 relatively move, which, as shown in FIG. 8, includes:

Step 801: UE 2 establishes a D2D link to UE 1.

Specifically, a specific implementation manner of establishing, by the UE 2, the D2D link to the UE 1 is the same as step 701 in Embodiment 1, and is not described in detail herein again.

If the UE 2 moves, a relative position of the UE 2 and a base station also changes, and for TA adjustment on a link between the UE 2 and the base station, step 802 is performed.

Step 802: A base station delivers a TA command between the UE 2 and the base station to the UE 2; and correspondingly, the UE 2 receives the TA command, delivered by the base station, between the UE 2 and the base station.

If the UE 2 moves, a relative position of the UE 1 and the UE 2 also changes, and for TA adjustment on a link between the UE 2 and the UE 1, step 803 is performed.

Step 803: The UE 1 acquires timing information of the D2D link between the UE 1 and the UE 2.

Step 804: The UE 1 acquires a TA command between the UE 1 and the UE 2 according to timing adjustment information.

Step 805: The UE 1 sends the TA command to the UE 2; and correspondingly, the UE 2 receives the TA command sent by the UE 1.

Specifically, the TA command between the UE 2 and the UE 1 is transmitted between the UEs, and the TA command is transmitted by using an interface between terminals.

Further, when the UE 2 needs to reply when receiving the TA command sent by the UE 1, step 806 is performed.

Step 806: The UE 2 generates TA Command ACK handshake signaling.

Step 807: The UE 2 sends the TA Command ACK handshake signaling to the UE 1; and correspondingly, the UE 1 receives the TA Command ACK handshake signaling sent by the UE 2.

According to the timing advance adjustment method that is provided by this embodiment of the present invention, user equipment generates a TA command according to timing information between the user equipment and another user equipment, to perform TA adjustment on a D2D link between the user equipments, so that precise timing synchronization is achieved between the user equipments, and the user equipment can correctly extract data to correctly decode the data, thereby improving a system throughput.

Figure 9:
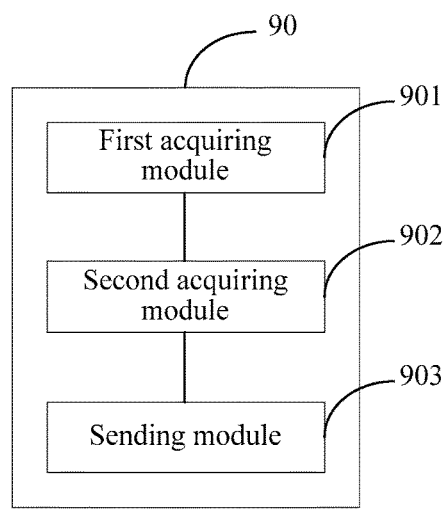
FIG. 9 is a schematic diagram of a structure of a base station according to an embodiment of the present invention.

An embodiment of the present invention further provides a base station 90. Function modules in the device correspond to steps of the method performed by the base station, and can perform the process in the embodiment shown in FIG. 1 of the present invention, and details are not described herein. As shown in FIG. 9, the base station 90 includes:

a first acquiring module 901, configured to acquire timing information determined by first user equipment, where the timing information is used to identify a timing relationship between the first user equipment and second user equipment;

a second acquiring module 902, configured to acquire a TA command according to the timing information acquired by the first acquiring module 901, where the TA command is used to adjust a signal sending time of a TA command receive end, and the TA command receive end is the first user equipment and/or the second user equipment; and a sending module 903, configured to send the TA command acquired by the second acquiring module 902 to the TA command receive end.

Figure 10:
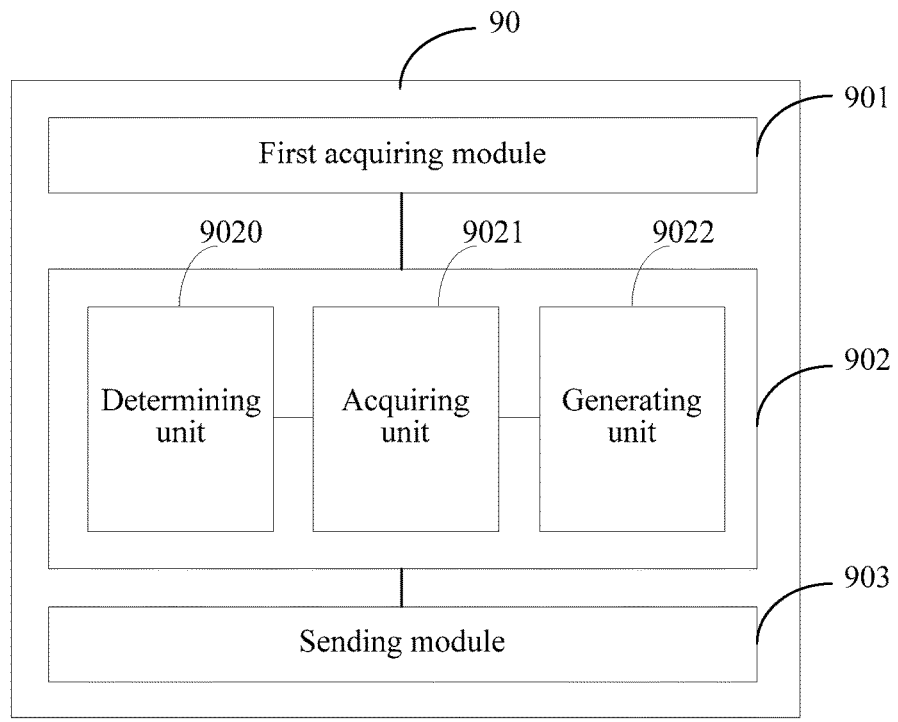
FIG. 10 is a schematic diagram of a structure of another base station according to an embodiment of the present invention.

Optionally, the timing information acquired by the first acquiring module 901 includes: a link identifier of a link between the first user equipment and the second user equipment, and the timing relationship between the first user equipment and the second user equipment; and as shown in FIG. 10, the second acquiring module 902 includes:

a determining unit 9020, configured to determine, according to the link identifier acquired by the first acquiring module 901, that objects/an object on which timing advance adjustment is to be performed are/is the first user equipment and/or the second user equipment;

an acquiring unit 9021, configured to acquire a TA adjustment value of the link between the first user equipment and the second user equipment according to the timing relationship between the first user equipment and the second user equipment that is acquired by the first acquiring module 901, a timing relationship between the base station and the first user equipment, and a timing relationship between the base station and the second user equipment; and a generating unit 9022, configured to generate the TA command according to the link identifier acquired by the determining unit 9020 and the TA adjustment value acquired by the acquiring unit 9021, where the TA command includes: the link identifier of the link between the first user equipment and the second user equipment, and the TA adjustment value of the link between the first user equipment and the second user equipment.

Optionally, the timing information acquired by the first acquiring module 901 includes: equipment identifiers of the first user equipment and the second user equipment, and the timing relationship between the first user equipment and the second user equipment; and as shown in FIG. 10, the determining unit 9020 in the second acquiring module 902 is further configured to determine, according to the equipment identifiers acquired by the first acquiring module 901, that objects/an object on which timing advance adjustment is to be performed are/is the first user equipment and/or the second user equipment;

the acquiring unit 9021 is further configured to acquire a TA adjustment value of a link between the first user equipment and the second user equipment according to the timing relationship between the first user equipment and the second user equipment that is acquired by the first acquiring module 901, a timing relationship between the base station and the first user equipment, and a timing relationship between the base station and the second user equipment; and the generating unit 9022 is further configured to generate the TA command according to the link identifier acquired by the determining unit 9020 and the TA adjustment value acquired by the acquiring unit 9021, where the TA command includes: the equipment identifiers of the first user equipment and the second user equipment, and the TA adjustment value of the link between the first user equipment and the second user equipment.

Optionally, the TA command generated by the generating unit 9022 further includes: a TA adjustment value of a link between the TA command receive end and the base station.

According to the timing advance adjustment base station that is provided by this embodiment of the present invention, the base station generates a TA command according to timing information sent by user equipment, to perform TA adjustment on a D2D link between user equipments and a link between the user equipment and the base station, so that precise timing synchronization is achieved between the user equipments, and the user equipment can correctly extract data to correctly decode the data, thereby improving a system throughput.

Figure 11:
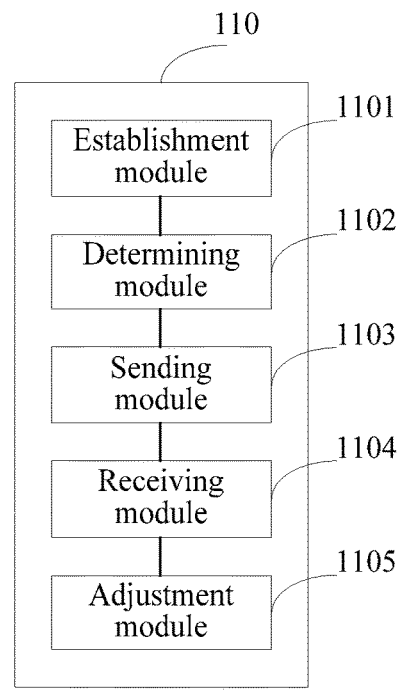
FIG. 11 is a schematic diagram of a structure of user equipment according to an embodiment of the present invention.

An embodiment of the present invention further provides user equipment 110. Function modules in the user equipment correspond to steps of the method performed by the user equipment, and can perform the process in the embodiment shown in FIG. 2 of the present invention, and details are not described herein. As shown in FIG. 11, the user equipment 110 includes:

an establishment module 1101, configured to establish a D2D link to second user equipment;

a determining module 1102, configured to determine timing information between the user equipment and the second user equipment according to the D2D link established by the establishment module 1101, where the timing information is used to identify a timing relationship between the user equipment and second user equipment;

a sending module 1103, configured to send the timing information acquired by the determining module 1102 to a base station;

a receiving module 1104, configured to receive a TA command sent by the base station, where the TA command is acquired by the base station according to the timing information sent by the sending module; and an adjustment module 1105, configured to adjust a signal sending time according to the TA command of the receiving module 1104.

Optionally, the timing information acquired by the determining module 1102 includes: a link identifier of a link between the user equipment and the second user equipment, and the timing relationship between the user equipment and the second user equipment; and the TA command acquired by the receiving module 1104 includes: the link identifier of the link between the user equipment and the second user equipment, and a TA adjustment value of the link between the user equipment and the second user equipment.

Optionally, the timing information acquired by the determining module 1102 includes: equipment identifiers of the user equipment and the second user equipment, and the timing relationship between the user equipment and the second user equipment; and the TA command acquired by the receiving module 1104 includes: the equipment identifiers of the user equipment and the second user equipment, and a TA adjustment value of a link between the user equipment and the second user equipment.

Optionally, the TA command acquired by the receiving module 1104 further includes: a TA adjustment value of a link between the user equipment and the base station.

According to the timing advance adjustment user equipment that is provided by this embodiment of the present invention, the user equipment establishes a D2D link to second user equipment, determines timing information of the D2D link, and sends the timing information to a base station; and the base station generates a TA command according to the timing information sent by the user equipment, to perform TA adjustment on the D2D link between the user equipments and a link between the user equipment and the base station, so that precise timing synchronization is achieved between the user equipments, and the user equipment can correctly extract data to correctly decode the data, thereby improving a system throughput.

Figure 12:
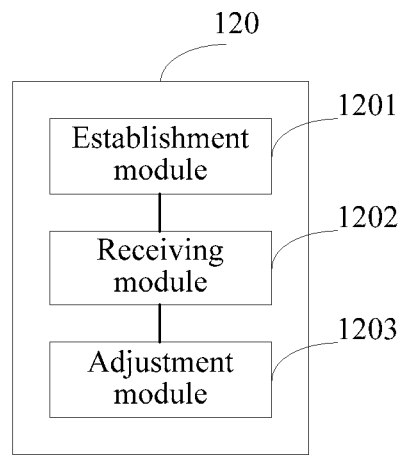
FIG. 12 is a schematic diagram of a structure of another user equipment according to an embodiment of the present invention.

An embodiment of the present invention further provides user equipment 120. Function modules in the equipment correspond to steps of the method performed by the user equipment, and can perform the process in the embodiment shown in FIG. 3 of the present invention, and details are not described herein. As shown in FIG. 12, the user equipment 120 includes:

an establishment module 1201, configured to establish a D2D link to first user equipment;

a receiving module 1202, configured to receive a TA command sent by a base station, where the TA command is acquired by the base station according to timing information sent by the first user equipment, and the timing information is determined by the first user equipment and is used to identify a timing relationship between the first user equipment and the second user equipment; and an adjustment module 1203, configured to adjust a signal sending time according to the TA command acquired by the receiving module 1202.

Optionally, the timing information includes: a link identifier of a link between the first user equipment and the second user equipment, and the timing relationship between the first user equipment and the second user equipment; and the TA command acquired by the receiving module 1202 includes: the link identifier of the link between the first user equipment and the user equipment, and a TA adjustment value of the link between the first user equipment and the user equipment.

Optionally, the timing information includes: equipment identifiers of the first user equipment and the user equipment, and the timing relationship between the first user equipment and the user equipment; and the TA command acquired by the receiving module 1202 includes: the equipment identifiers of the first user equipment and the second user equipment, and a TA adjustment value of a link between the first user equipment and the second user equipment.

Optionally, the TA command acquired by the receiving module 1202 further includes: a TA adjustment value of a link between the user equipment and the base station.

According to the timing advance adjustment user equipment that is provided by this embodiment of the present invention, the user equipment establishes a D2D link to first user equipment, and receives a TA command sent by a base station, to perform TA adjustment on the D2D link between the user equipment and the first user equipment and a link between the user equipment and the base station, so that precise timing synchronization is achieved between the user equipments, and the user equipment can correctly extract data to correctly decode the data, thereby improving a system throughput.

Figure 13:
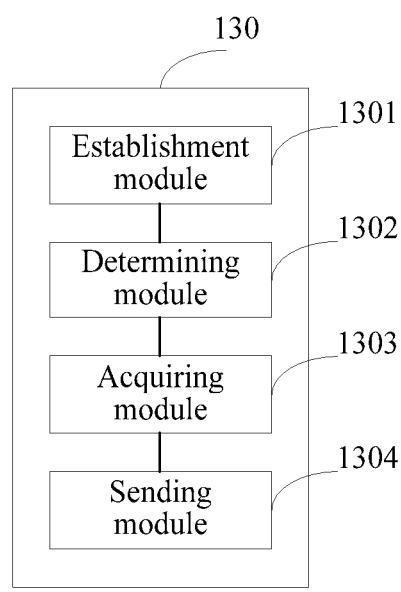
FIG. 13 is a schematic diagram of a structure of another user equipment according to an embodiment of the present invention.

An embodiment of the present invention further provides user equipment 130. Function modules in the equipment correspond to steps of the method, and can perform the process in the embodiment shown in FIG. 4 of the present invention, and details are not described herein. As shown in FIG. 13, the user equipment 130 includes:

an establishment module 1301, configured to establish a D2D link to second user equipment;

a determining module 1302, configured to determine timing information between the user equipment and the second user equipment according to the D2D link established by the establishment module 1301, where the timing information is used to identify a timing relationship between the user equipment and second user equipment;

an acquiring module 1303, configured to acquire a TA command according to the timing information acquired by the determining module 1302, where the TA command is used to adjust a signal sending time of the second user equipment; and a sending module 1304, configured to send the TA command acquired by the acquiring module 1303 to the second user equipment.

Figure 14:
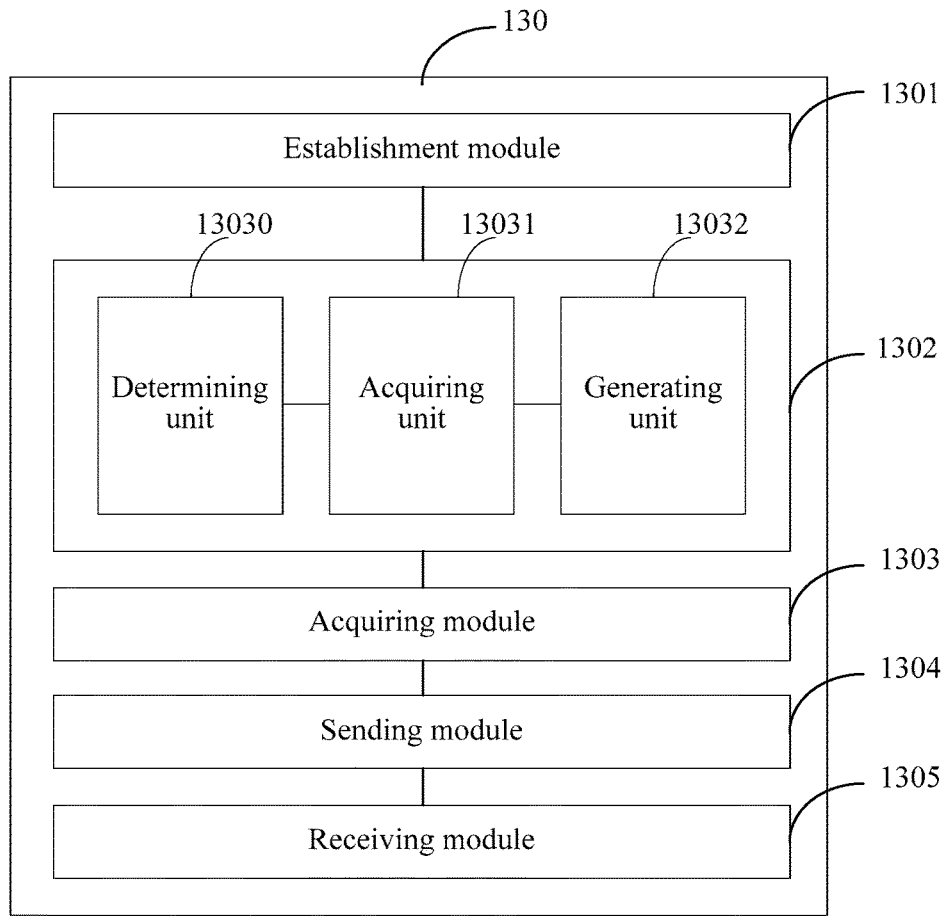
FIG. 14 is a schematic diagram of a structure of another user equipment according to an embodiment of the present invention.

Optionally, the timing information acquired by the determining module 1302 includes: a link identifier of a link between the user equipment and the second user equipment, and the timing relationship between the user equipment and the second user equipment; and as shown in FIG. 14, the acquiring module 1303 includes:

a determining unit 13030, configured to determine, according to the link identifier acquired by the determining module 1302, that an object on which timing advance adjustment is to be performed is the second user equipment;

an acquiring unit 13031, configured to acquire a TA adjustment value of the link between the user equipment and the second user equipment according to the timing relationship between the user equipment and the second user equipment that is acquired by the determining module 1302; and a generating unit 13032, configured to generate the TA command according to the link identifier acquired by the determining unit 13030 and the TA adjustment value acquired by the acquiring unit 13031, where the TA command includes: the link identifier of the link between the user equipment and the second user equipment, and the TA adjustment value of the link between the user equipment and the second user equipment.

Optionally, the timing information acquired by the determining module 1302 includes: equipment identifiers of the user equipment and the second user equipment, and the timing relationship between the user equipment and the second user equipment; and as shown in FIG. 14, the determining unit 13030 in the acquiring module 1303 is further configured to determine, according to the equipment identifiers acquired by the determining module 1302, that an object on which timing advance adjustment is to be performed is the second user equipment;

the acquiring unit 13031 is further configured to acquire a TA adjustment value of a link between the user equipment and the second user equipment according to the timing relationship between the user equipment and the second user equipment that is acquired by the determining module 1302; and the generating unit 13032 is further configured to generate the TA command according to the equipment identifiers acquired by the determining unit 13030 and the TA adjustment value acquired by the acquiring unit, where the TA command includes: the equipment identifiers of the user equipment and the second user equipment, and the TA adjustment value of the link between the user equipment and the second user equipment.

Optionally, the sending module 1304 is specifically configured to send the TA command acquired by the acquiring module to the second user equipment by using an interface between terminals.

Optionally, as shown in FIG. 14, the user equipment 130 further includes: a receiving module 1305, where the receiving module 1305 is configured to: after the sending module 1304 sends the TA command to the second user equipment, receive handshake signaling sent by the second user equipment.

Optionally, the receiving module 1305 is specifically configured to receive, by using the interface between the terminals, the handshake signaling sent by the second user equipment.

According to the timing advance adjustment user equipment that is provided by this embodiment of the present invention, the user equipment establishes a D2D link to another user equipment, and generates a TA command according to timing information between the user equipment and the another user equipment, to perform TA adjustment on the D2D link between the user equipments, so that precise timing synchronization is achieved between the user equipments, and the user equipment can correctly extract data to correctly decode the data, thereby improving a system throughput.

Figure 15:
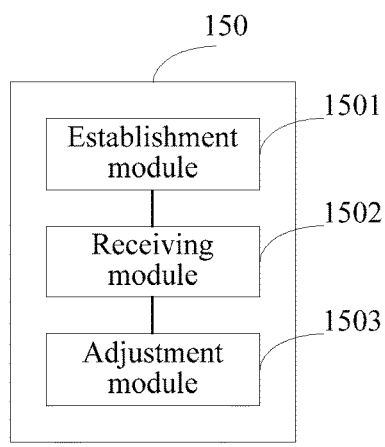
FIG. 15 is a schematic diagram of a structure of another user equipment according to an embodiment of the present invention.

An embodiment of the present invention further provides user equipment 150. Function modules in the equipment correspond to steps of the method performed by the user equipment, and can perform the process in the embodiment shown in FIG. 5 of the present invention, and details are not described herein. As shown in FIG. 15, the base station 150 includes:

an establishment module 1501, configured to establish a D2D link to first user equipment;

a receiving module 1502, configured to receive a TA command sent by the first user equipment, where the TA command is acquired by the first user equipment according to determined timing information, and the timing information is used to identify a timing relationship between the first user equipment and the second user equipment; and an adjustment module 1503, configured to adjust a signal sending time according to the TA command acquired by the receiving module 1502.

Optionally, the timing information includes: a link identifier of a link between the first user equipment and the user equipment, and the timing relationship between the first user equipment and the user equipment; and the TA command acquired by the receiving module 1502 includes: the link identifier of the link between the first user equipment and the user equipment, and a TA adjustment value of the link between the first user equipment and the user equipment.

Optionally, the timing information includes: equipment identifiers of the first user equipment and the second user equipment, and the timing relationship between the first user equipment and the second user equipment; and the TA command acquired by the receiving module 1502 includes: the equipment identifiers of the first user equipment and the user equipment, and a TA adjustment value of a link between the first user equipment and the user equipment.

Optionally, the receiving module 1502 is specifically configured to receive, by using an interface between terminals, the TA command sent by the first user equipment.

Figure 16:
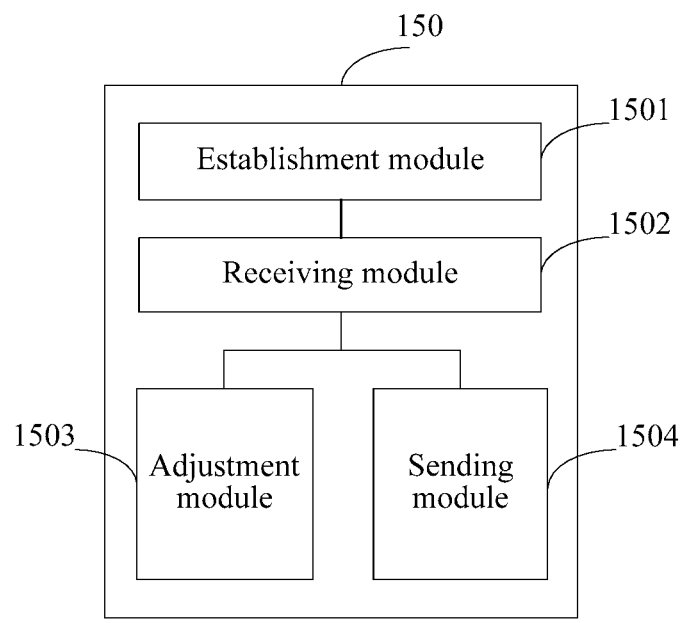
FIG. 16 is a schematic diagram of a structure of another user equipment according to an embodiment of the present invention.

Optionally, as shown in FIG. 16, the user equipment 150 further includes: a sending module 1504, where the sending module 1504 is configured to: after the receiving module 1502 receives the TA command sent by the first user equipment, send handshake signaling to the first user equipment.

Optionally, the sending module 1504 is specifically configured to send the handshake signaling to the first user equipment by using the interface between the terminals.

According to the timing advance adjustment user equipment that is provided by this embodiment of the present invention, the user equipment establishes a D2D link to first user equipment, and receives a TA command that is generated by the first user equipment according to timing information between the first user equipment and the user equipment, to perform TA adjustment on the D2D link between the user equipments, so that precise timing synchronization is achieved between the user equipments, and the user equipment can correctly extract data to correctly decode the data, thereby improving a system throughput.

Figure 17:
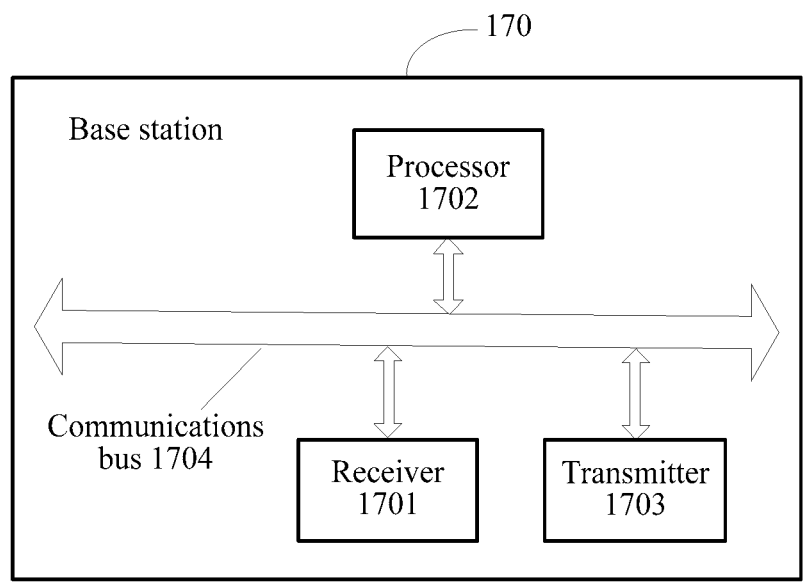
FIG. 17 is a schematic diagram of a physical apparatus of a base station according to an embodiment of the present invention.

An embodiment of the present invention provides a base station 170. Function modules in the device correspond to steps of the method performed by the base station, and details are not described herein. As shown in FIG. 17, the base station 170 includes: a receiver 1701, a processor 1702, a transmitter 1703, and a communications bus 1704.

The receiver 1701, the processor 1702, and the transmitter 1703 communicate with each other by using the communications bus 1704.

The receiver 1701 is configured to acquire timing information determined by first user equipment, where the timing information is used to identify a timing relationship between the first user equipment and second user equipment.

The processor 1702 is configured to acquire a TA command according to the timing information acquired by the receiver 1701, where the TA command is used to adjust a signal sending time of a TA command receive end, and the TA command receive end is the first user equipment and/or the second user equipment.

The transmitter 1703 is configured to send the TA command acquired by the processor 1702 to the TA command receive end.

Optionally, the timing information acquired by the receiver 1701 includes: a link identifier of a link between the first user equipment and the second user equipment, and the timing relationship between the first user equipment and the second user equipment.

The processor 1702 is specifically configured to determine, according to the link identifier, that objects/an object on which timing advance adjustment is to be performed are/is the first user equipment and/or the second user equipment; acquire a TA adjustment value of the link between the first user equipment and the second user equipment according to the timing relationship between the first user equipment and the second user equipment, a timing relationship between the base station and the first user equipment, and a timing relationship between the base station and the second user equipment; and generate the TA command, where the TA command includes: the link identifier of the link between the first user equipment and the second user equipment, and the TA adjustment value of the link between the first user equipment and the second user equipment.

Optionally, the timing information acquired by the receiver 1701 includes: equipment identifiers of the first user equipment and the second user equipment, and the timing relationship between the first user equipment and the second user equipment; and the processor 1702 is specifically configured to determine, according to the equipment identifiers, that objects/an object on which timing advance adjustment is to be performed are/is the first user equipment and/or the second user equipment; acquire a TA adjustment value of a link between the first user equipment and the second user equipment according to the timing relationship between the first user equipment and the second user equipment, a timing relationship between the base station and the first user equipment, and a timing relationship between the base station and the second user equipment; and generate the TA command, where the TA command includes: the equipment identifiers of the first user equipment and the second user equipment, and the TA adjustment value of the link between the first user equipment and the second user equipment.

Optionally, the TA command acquired by the receiver 1701 further includes: a TA adjustment value of a link between the TA command receive end and the base station.

According to the timing advance adjustment base station that is provided by this embodiment of the present invention, the base station generates a TA command according to timing information sent by user equipment, to perform TA adjustment on a D2D link between user equipments and a link between the user equipment and the base station, so that precise timing synchronization is achieved between the user equipments, and the user equipment can correctly extract data to correctly decode the data, thereby improving a system throughput.

Figure 18:
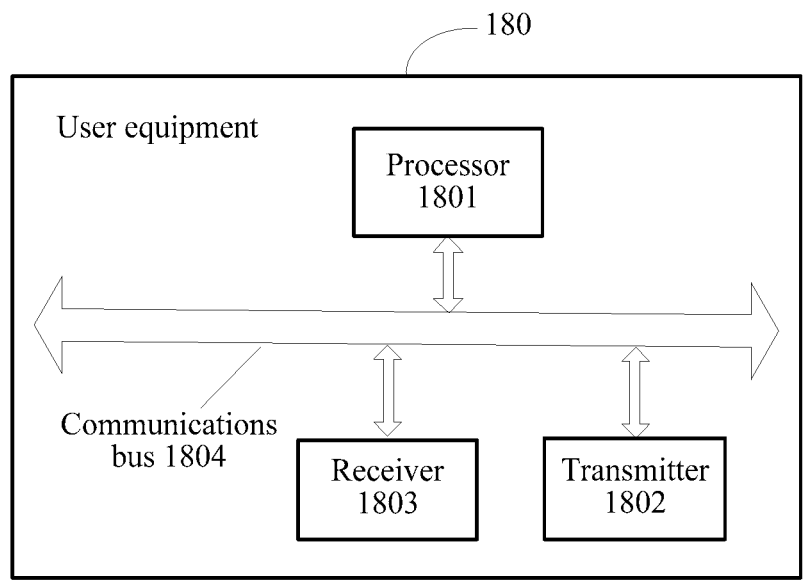
FIG. 18 is a schematic diagram of a physical apparatus of user equipment according to an embodiment of the present invention.

An embodiment of the present invention provides user equipment 180. Function modules in the device correspond to steps of the method performed by the user equipment, and details are not described herein. As shown in FIG. 18, the user equipment 180 includes: a processor 1801, a transmitter 1802, a receiver 1803, and a communications bus 1804.

The processor 1801, the transmitter 1802, and the receiver 1803 communicate with each other by using the communications bus 1804.

The processor 1801 is configured to establish a D2D link to second user equipment, and determine timing information between the user equipment and the second user equipment, where the timing information is used to identify a timing relationship between the first user equipment and the second user equipment.

The transmitter 1802 is configured to send the timing information acquired by the processor 1801 to a base station.

The receiver 1803 receives a TA command sent by the base station, where the TA command is acquired by the base station according to the timing information.

The processor 1801 is further configured to adjust a signal sending time according to the TA command acquired by the receiver 1803.

Optionally, the timing information acquired by the processor 1801 includes: a link identifier of a link between the first user equipment and the second user equipment, and the timing relationship between the first user equipment and the second user equipment; and the TA command acquired by the receiver 1803 includes: the link identifier of the link between the first user equipment and the second user equipment, and a TA adjustment value of the link between the first user equipment and the second user equipment.

Optionally, the timing information acquired by the processor 1801 includes: equipment identifiers of the first user equipment and the second user equipment, and the timing relationship between the first user equipment and the second user equipment; and the TA command acquired by the receiver 1803 includes: the equipment identifiers of the first user equipment and the second user equipment, and a TA adjustment value of a link between the first user equipment and the second user equipment.

Optionally, the TA command acquired by the receiver 1803 further includes: a TA adjustment value of a link between the first user equipment and the base station.

According to the timing advance adjustment user equipment that is provided by this embodiment of the present invention, the user equipment establishes a D2D link to second user equipment, determines timing information of the D2D link, and sends the timing information to a base station; and the base station generates a TA command according to the timing information sent by the user equipment, to perform TA adjustment on the D2D link between the user equipments and a link between the user equipment and the base station, so that precise timing synchronization is achieved between the user equipments, and the user equipment can correctly extract data to correctly decode the data, thereby improving a system throughput.

Figure 19:
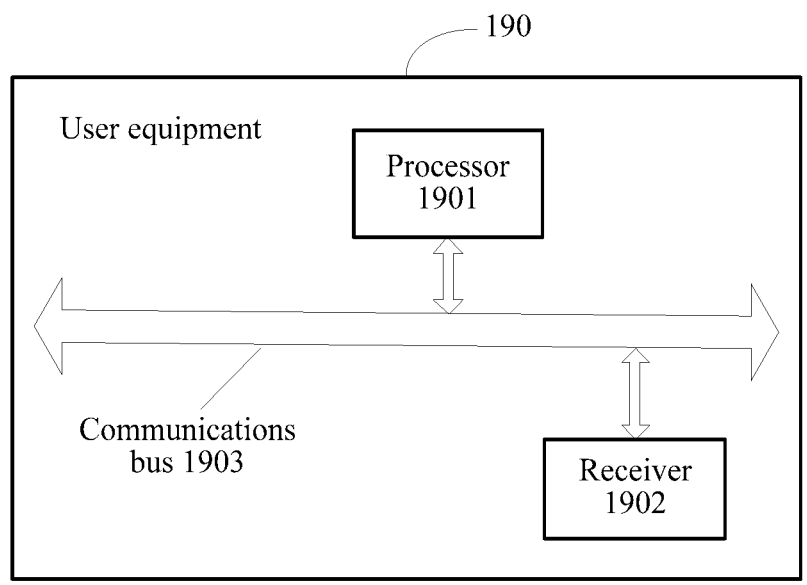
FIG. 19 is a schematic diagram of a physical apparatus of another user equipment according to an embodiment of the present invention.

An embodiment of the present invention provides user equipment 190. The function modules in the device correspond to steps of the method performed by the user equipment, and details are not described herein. As shown in FIG. 19, the user equipment 190 includes: a processor 1901, a receiver 1902, and a communications bus 1903.

The processor 1901 and the receiver 1902 communicate with each other by using the communications bus 1903.

The processor 1901 is configured to establish a D2D link to first user equipment.

The receiver 1902 is configured to receive a TA command sent by a base station, where the TA command is acquired by the base station according to timing information sent by the first user equipment, and the timing information is determined by the first user equipment and is used to identify a timing relationship between the first user equipment and the second user equipment.

The processor 1901 is further configured to adjust a signal sending time according to the TA command acquired by the receiver 1902.

Optionally, the timing information includes: a link identifier of a link between the first user equipment and the second user equipment, and the timing relationship between the first user equipment and the second user equipment; and the TA command acquired by the receiver 1902 includes: the link identifier of the link between the first user equipment and the second user equipment, and a TA adjustment value of the link between the first user equipment and the second user equipment.

Optionally, the timing information includes: equipment identifiers of the first user equipment and the second user equipment, and the timing relationship between the first user equipment and the second user equipment; and the TA command acquired by the receiver 1902 includes: the equipment identifiers of the first user equipment and the second user equipment, and a TA adjustment value of a link between the first user equipment and the second user equipment.

Optionally, the TA command acquired by the receiver 1902 further includes: a TA adjustment value of a link between the second user equipment and the base station.

According to the timing advance adjustment user equipment that is provided by this embodiment of the present invention, the user equipment establishes a D2D link to first user equipment, and receives a TA command sent by a base station, to perform TA adjustment on the D2D link between the user equipment and the first user equipment and a link between the user equipment and the base station, so that precise timing synchronization is achieved between the user equipments, and the user equipment can correctly extract data to correctly decode the data, thereby improving a system throughput.

Figure 20:
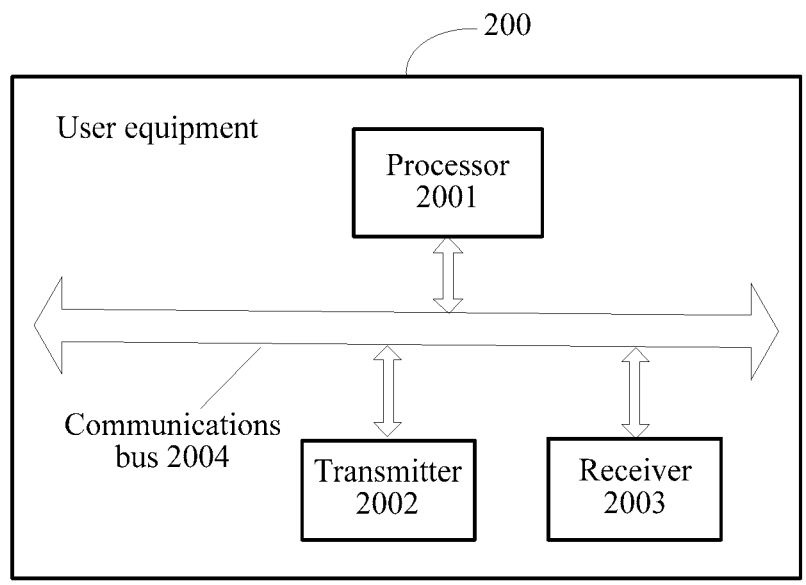
FIG. 20 is a schematic diagram of a physical apparatus of another user equipment according to an embodiment of the present invention.

An embodiment of the present invention provides user equipment 200. The function modules in the device correspond to steps of the method performed by the user equipment, and details are not described herein. As shown in FIG. 20, the user equipment 200 includes: a processor 2001, a transmitter 2002, a receiver 2003, and a communications bus 2004.

The processor 2001, the transmitter 2002, and the receiver 2003 communicate with each other by using the communications bus 2004.

The processor 2001 is configured to establish a D2D link to second user equipment, determine timing information between the user equipment and the second user equipment, and acquire a TA command according to the timing information, where the timing information is used to identify a timing relationship between the first user equipment and the second user equipment, and the TA command is used to adjust a signal sending time of the second user equipment.

The transmitter 2002 is configured to send the TA command acquired by the processor 2001 to the second user equipment.

Optionally, the timing information acquired by the processor 2001 includes: a link identifier of a link between the first user equipment and the second user equipment, and the timing relationship between the first user equipment and the second user equipment; and the processor 2001 is specifically configured to determine, according to the link identifier, that an object on which timing advance adjustment is to be performed is the second user equipment; acquire a TA adjustment value of a link between the first user equipment and the second user equipment according to the timing relationship between the first user equipment and the second user equipment; and generate the TA command, where the TA command includes: the link identifier of the link between the first user equipment and the second user equipment, and the TA adjustment value of the link between the first user equipment and the second user equipment.

Optionally, the timing information acquired by the processor 2001 includes: equipment identifiers of the first user equipment and the second user equipment, and the timing relationship between the first user equipment and the second user equipment; and the processor 2001 is further specifically configured to determine, according to the equipment identifiers, that an object on which timing advance adjustment is to be performed is the second user equipment; acquire a TA adjustment value of a link between the first user equipment and the second user equipment according to the timing relationship between the first user equipment and the second user equipment; and generate the TA command, where the TA command includes: the equipment identifiers of the first user equipment and the second user equipment, and the TA adjustment value of the link between the first user equipment and the second user equipment.

Optionally, the transmitter 2002 is specifically configured to send the TA command to the second user equipment by using an interface between terminals.

Optionally, the receiver 2003 is configured to: after the transmitter 2002 sends the TA command to the second user equipment, receive handshake signaling sent by the second user equipment.

Optionally, the receiver 2003 is specifically configured to receive, by using the interface between the terminals, the handshake signaling sent by the second user equipment.

According to the timing advance adjustment user equipment that is provided by this embodiment of the present invention, the user equipment establishes a D2D link to another user equipment, and generates a TA command according to timing information between the user equipment and the another user equipment, to perform TA adjustment on the D2D link between the user equipments, so that precise timing synchronization is achieved between the user equipments, and the user equipment can correctly extract data to correctly decode the data, thereby improving a system throughput.

Figure 21:
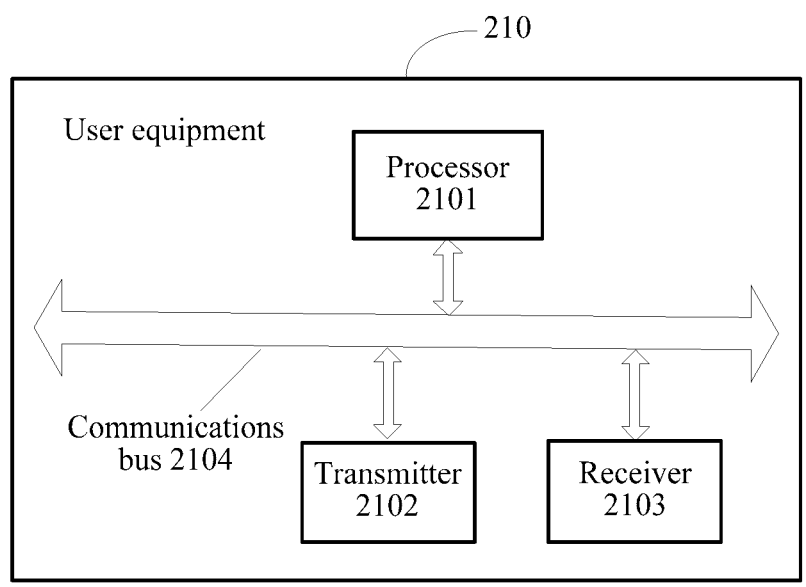
FIG. 21 is a schematic diagram of a physical apparatus of another user equipment according to an embodiment of the present invention.

An embodiment of the present invention provides user equipment 210. The function modules in the device correspond to steps of the method performed by the user equipment, and details are not described herein. As shown in FIG. 21, the user equipment 210 includes: a processor 2101, a transmitter 2102, a receiver 2103, and a communications bus 2104.

The processor 2101, the transmitter 2102, and the receiver 2103 communicate with each other by using the communications bus 2104.

The processor 2101 is configured to establish a D2D link to first user equipment.

The receiver 2102 is configured to receive a TA command sent by the first user equipment, where the TA command is acquired by the first user equipment according to determined timing information, and the timing information is used to identify a timing relationship between the first user equipment and the second user equipment.

The processor 2101 is further configured to adjust a signal sending time according to the TA command acquired by the receiver 2102.

Optionally, the timing information includes: a link identifier of a link between the first user equipment and the second user equipment, and the timing relationship between the first user equipment and the second user equipment; and the TA command acquired by the receiver 2102 includes: the link identifier of the link between the first user equipment and the second user equipment, and a TA adjustment value of the link between the first user equipment and the second user equipment.

Optionally, the timing information includes: equipment identifiers of the first user equipment and the second user equipment, and the timing relationship between the first user equipment and the second user equipment; and the TA command acquired by the receiver 2102 includes: the equipment identifiers of the first user equipment and the second user equipment, and a TA adjustment value of a link between the first user equipment and the second user equipment.

Optionally, the receiver 2102 is specifically configured to receive, by using an interface between terminals, the TA command sent by the first user equipment.

Optionally, the transmitter 2103 is configured to: after the receiver 2102 receives the TA command sent by the first user equipment, send handshake signaling to the first user equipment.

Optionally, the transmitter 2103 is specifically configured to send the handshake signaling to the first user equipment by using an interface between terminals.

According to the timing advance adjustment user equipment that is provided by this embodiment of the present invention, the user equipment establishes a D2D link to first user equipment, and receives a TA command that is generated by the first user equipment according to timing information between the first user equipment and the user equipment, to perform TA adjustment on the D2D link between the user equipments, so that precise timing synchronization is achieved between the user equipments, and the user equipment can correctly extract data to correctly decode the data, thereby improving a system throughput.

In the several embodiments provided by this application, it should be understood that the disclosed system, apparatus, and method may be implemented in other manners. For example, the described apparatus embodiment is merely exemplary. For example, the unit division is merely logical function division and may be other division in actual implementation. For example, multiple units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on multiple network units. Some or all of the units may be selected according to actual needs to achieve the objectives of the solutions of the embodiments.

In addition, functional units in the embodiments of the present invention may be integrated into one processing unit, or each of the units may exist alone physically, or two or more units are integrated into one unit. The integrated unit may be implemented in a form of hardware, or may be implemented in a form of hardware in addition to a software functional unit.

When the foregoing integrated unit is implemented in a form of a software functional unit, the integrated unit may be stored in a computer-readable storage medium. The software functional unit is stored in a storage medium and includes several instructions for instructing a computer device (which may be a personal computer, a server, or a network device) to perform some of the steps of the methods described in the embodiments of the present invention. The foregoing storage medium includes: any medium that can store program code, such as a USB flash drive, a removable hard disk, a read-only memory (Read-Only Memory, ROM for short), a random access memory (Random Access Memory, RAM for short), a magnetic disk, or an optical disc.

Finally, it should be noted that the foregoing embodiments are merely intended for describing the technical solutions of the present invention but not for limiting the present invention. Although the present invention is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of the present invention.

What is claimed is:

1. A base station, comprising:
   a receiver configured to acquire, from a first user equipment, timing information including a link identifier of a D2D link between the first user equipment and a second user equipment, and a timing relationship between the first user equipment and the second user equipment;
   a processor configured to:
      determine whether the first user equipment and the second user equipment are in a same D2D cluster,
      acquire a timing advance (TA) adjustment value of the D2D link between the first user equipment and the second user equipment according to the timing relationship between the first user equipment and the second user equipment, a timing relationship between the base station and the first user equipment, and a timing relationship between the base station and the second user equipment, wherein the timing relationships comprise propagation delays, and
      acquire a TA command comprising the TA adjustment value, wherein the TA command is used to adjust a signal sending time of a TA command receive end, and the TA command receive end is one of the first user equipment or the second user equipment; and
   a transmitter configured to send a notification to the first user equipment or the second user equipment for establishing the D2D link based on the first user equipment and the second user equipment being in a same D2D cluster, and send the TA command to the TA command receive end.

2. The base station according to claim 1, wherein the processor is further configured to:
   determine, according to the link identifier, that an object on which timing advance adjustment is to be performed is at least one of the first user equipment and the second user equipment; and
   generate the TA command, where the TA command further comprises: the link identifier of the D2D link between the first user equipment and the second user equipment.

3. The base station according to claim 1, wherein the timing information comprises equipment identifiers of the first user equipment and the second user equipment, and the processor is further configured to:
   determine, according to the equipment identifiers, that an object on which timing advance adjustment is to be performed is at least one of the first user equipment and the second user equipment; and
   generate the TA command, where the TA command further comprises: the equipment identifiers of the first user equipment and the second user equipment.

4. The base station according to claim 1, wherein the TA command further comprises: a TA adjustment value of a link between the TA command receive end and the base station.

5. The base station according to claim 2, wherein the TA command further comprises: a TA adjustment value of a link between the TA command receive end and the base station.

6. The base station according to claim 3, wherein the TA command further comprises: a TA adjustment value of a link between the TA command receive end and the base station.

7. A first user equipment, comprising:
   a processor configured to establish a D2D link to a second user equipment based on a notification by a base station that the first user equipment and the second user equipment are in a same D2D cluster, and determine timing information between the first user equipment and the second user equipment, wherein the timing information includes a link identifier of the D2D link between the first user equipment and the second user equipment, and a timing relationship between the first user equipment and the second user equipment;
   a transmitter configured to send the timing information acquired by the processor to the base station;
   a receiver configured to receive a timing adjustment (TA) command from the base station, wherein the TA command is acquired by the base station according to the timing information, wherein the TA command comprises a TA adjustment value of the D2D link between the first user equipment and the second user equipment determined according to the timing relationship between the first user equipment and the second user equipment, a timing relationship between the base station and the first user equipment, and a timing relationship between the base station and the second user equipment, and wherein the timing relationships comprise propagation delays; and
   the processor is further configured to adjust a signal sending time on the D2D link according to the TA command.

8. The first user equipment according to claim 7, wherein the TA command acquired by the receiver further comprises:

the link identifier of the D2D link between the first user equipment and the second user equipment.

9. The first user equipment according to claim 7, wherein the timing information acquired by the processor comprises: equipment identifiers of the first user equipment and the second user equipment; and
the TA command acquired by the receiver further comprises: the equipment identifiers of the first user equipment and the second user equipment.

10. The first user equipment according to claim 7, wherein the TA command acquired by the receiver further comprises: a TA adjustment value of a link between the first user equipment and the base station.

11. The first user equipment according to claim 8, wherein the TA command acquired by the receiver further comprises: a TA adjustment value of a link between the first user equipment and the base station.

12. The first user equipment according to claim 9, wherein the TA command acquired by the receiver further comprises: a TA adjustment value of a link between the first user equipment and the base station.

13. A second user equipment, comprising:
a processor configured to establish a D2D link to a first user equipment based on a notification by a base station that the first user equipment and the second user equipment are in a same D2D cluster;
a receiver configured to receive a timing adjustment (TA) command sent by the base station, wherein the TA command is acquired by the base station according to timing information sent by the first user equipment, and the timing information is determined by the first user equipment and wherein the timing information includes a link identifier of the D2D link between the first user equipment and the second user equipment, and a timing relationship between the first user equipment and the second user, and
wherein the TA command comprises a TA adjustment value of the D2D link between the first user equipment and the second user equipment determined according to the timing relationship between the first user equipment and the second user equipment, a timing relationship between the base station and the first user equipment, and a timing relationship between the base station and the second user equipment, and wherein the timing relationships comprise propagation delays; and
the processor is further configured to adjust a signal sending time on the D2D link according to the TA command acquired by the receiver.

14. The second user equipment according to claim 13, wherein the TA command acquired by the receiver comprises: the link identifier of the D2D link between the first user equipment and the second user equipment.

15. The second user equipment according to claim 14, wherein the timing information comprises: equipment identifiers of the first user equipment and the second user equipment, and the timing relationship between the first user equipment and the second user equipment; and
the TA command acquired by the receiver comprises: the equipment identifiers of the first user equipment and the second user equipment.

16. The second user equipment according to claim 14, wherein the TA command further comprises: a TA adjustment value of a link between the second user equipment and the base station.

17. The second user equipment according to claim 15, wherein the TA command further comprises: a TA adjustment value of a link between the first user equipment and the base station.

18. The second user equipment according to claim 15, wherein the TA command further comprises: a TA adjustment value of a link between the first user equipment and the base station.

19. The first user equipment according to claim 7, wherein the transmitter is further configured to send a sounding reference signal (SRS) to the second user equipment for determining the timing relationship between the first user equipment and the second user equipment.

20. The second user equipment according to claim 13, wherein the receiver is further configured to receive a sounding reference signal (SRS) sequence for determining the timing relationship between the first user equipment and the second user equipment.

* * * * *